United States Patent
Fukui et al.

(10) Patent No.: US 12,503,598 B2
(45) Date of Patent: Dec. 23, 2025

(54) ORGANOPOLYSILOXANE CURED PRODUCT FILM AND USAGE, MANUFACTURING METHOD, AND MANUFACTURING APPARATUS THEREFOR

(71) Applicant: DOW TORAY CO., LTD., Tokyo (JP)

(72) Inventors: Hiroshi Fukui, Ichihara (JP); Takeaki Tsuda, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 758 days.

(21) Appl. No.: 17/429,476

(22) PCT Filed: Feb. 14, 2020

(86) PCT No.: PCT/JP2020/005725
§ 371 (c)(1),
(2) Date: Aug. 9, 2021

(87) PCT Pub. No.: WO2020/166692
PCT Pub. Date: Aug. 20, 2020

(65) Prior Publication Data
US 2022/0089872 A1 Mar. 24, 2022

(30) Foreign Application Priority Data
Feb. 14, 2019 (JP) ................. 2019-024428

(51) Int. Cl.
C08L 83/04 (2006.01)
(52) U.S. Cl.
CPC .................... C08L 83/04 (2013.01)
(58) Field of Classification Search
None
See application file for complete search history.

(56) References Cited

U.S. PATENT DOCUMENTS

| | | | |
|---|---|---|---|
| 2011/0171447 A1 | 7/2011 | Krishnamoorthy et al. | |
| 2015/0072108 A1 | 3/2015 | Fukaya et al. | |
| 2015/0315347 A1 | 11/2015 | Koellnberger et al. | |
| 2015/0380636 A1 | 12/2015 | Fujisawa et al. | |
| 2016/0154436 A1 | 6/2016 | Woo et al. | |
| 2019/0127531 A1 | 5/2019 | Fukui et al. | |
| 2019/0292417 A1* | 9/2019 | Nakayama | C08G 77/14 |
| 2019/0375969 A1 | 12/2019 | Yamazaki et al. | |
| 2020/0071527 A1 | 3/2020 | Fukui et al. | |
| 2020/0087514 A1 | 3/2020 | Fukui et al. | |

FOREIGN PATENT DOCUMENTS

| | | |
|---|---|---|
| JP | 2004122701 A | 4/2004 |
| JP | 2005288377 A | 10/2005 |
| JP | 2012115788 A | 6/2012 |
| JP | 2014116587 A | 6/2014 |
| JP | 2016500382 A | 1/2016 |
| JP | 2016113506 A | 6/2016 |
| WO | 2014105965 A1 | 7/2014 |
| WO | 2017183541 A1 | 10/2017 |
| WO | 2018056297 A1 | 3/2018 |
| WO | 2018155131 A1 | 8/2018 |
| WO | 2018211981 A1 | 11/2018 |
| WO | 2020116596 A1 | 6/2020 |

OTHER PUBLICATIONS

Machine assisted English translation of JP2004122701A obtained from https://worldwide.espacenet.com/patent on Jul. 20, 2023, 8 pages.
English translation of International Search Report for PCT/JP2020/005725 dated May 12, 2020, 3 pages.
Machine assisted English translation of JP2005288377A obtained from https://patents.google.com/patent on Aug. 6, 2021, 13 pages.
Machine assisted English translation of JP2012115788A obtained from https://patents.google.com/patent on Aug. 6, 2021, 10 pages.
Machine assisted English translation of JP2014116587A obtained from https://patents.google.com/patent on Aug. 6, 2021, 12 pages.
Machine assisted English translation of JP2016113506A obtained from https://patents.google.com/patent on Aug. 6, 2021, 7 pages.
Machine assisted English translation of WO2020116596A1 obtained from https://patents.google.com/patent on Aug. 6, 2021, 20 pages.

* cited by examiner

*Primary Examiner* — Robert T Butcher
(74) *Attorney, Agent, or Firm* — Warner Norcross + Judd LLP

(57) ABSTRACT

Provided is: an organopolysiloxane cured film that is superior as a thin film and, in terms of flatness, has significantly superior smoothness and flatness at the film surface, in addition to generally having high dielectric breakdown strength against a load voltage; along with a usage and manufacturing method therefor. The organopolysiloxane cured film, in which an arithmetic average height (Sa) of the film surface is less than 0.50 μm, while an average thickness at the center of the film is within a range of 1 to 20 μm. It is possible to obtain such a film by a manufacturing method including a die coating step in which a slot die is used to coat a curable organopolysiloxane composition on a continuously traveling substrate supported between a pair of support rolls by means of a tension support system.

20 Claims, 4 Drawing Sheets

[FIG. 1]
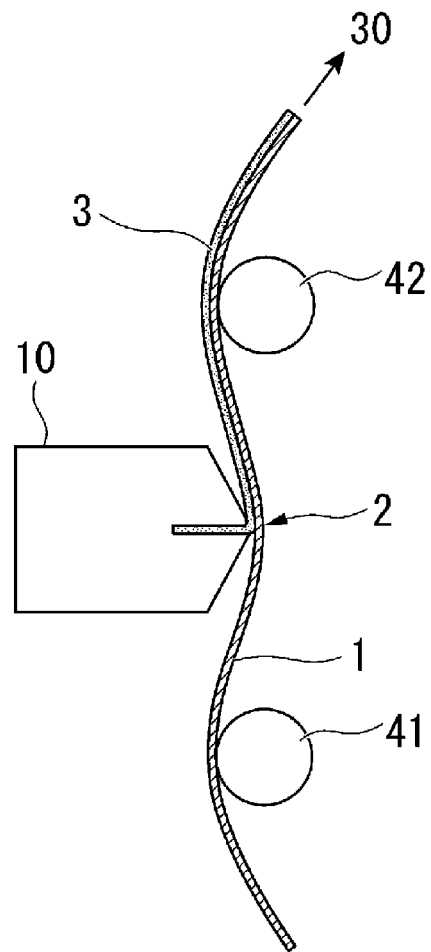
[FIG. 2]
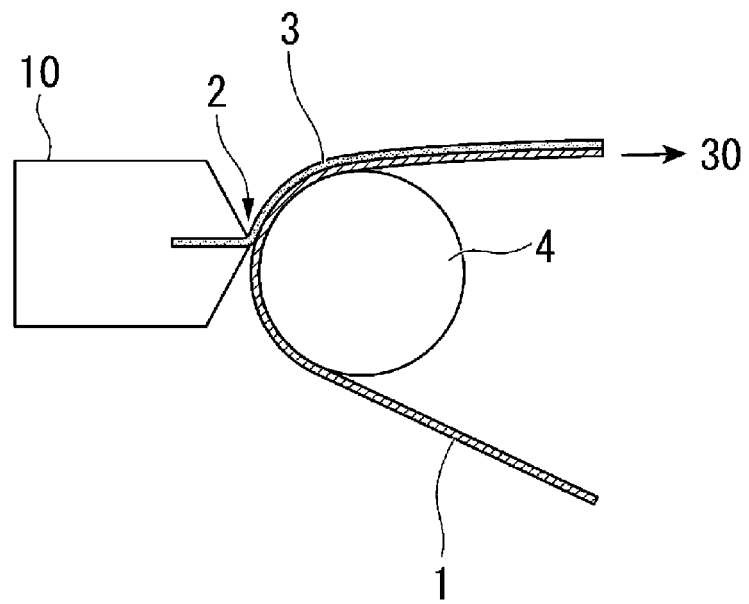

[FIG. 3]
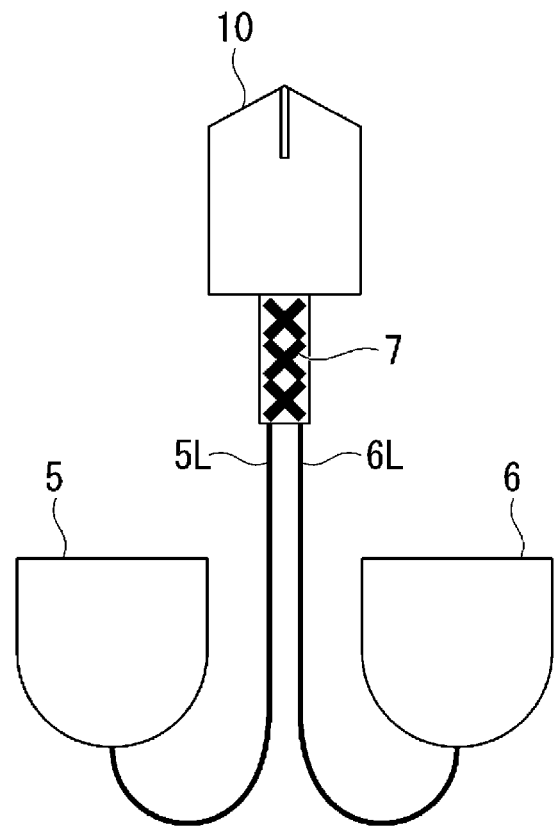
[FIG. 4-1]
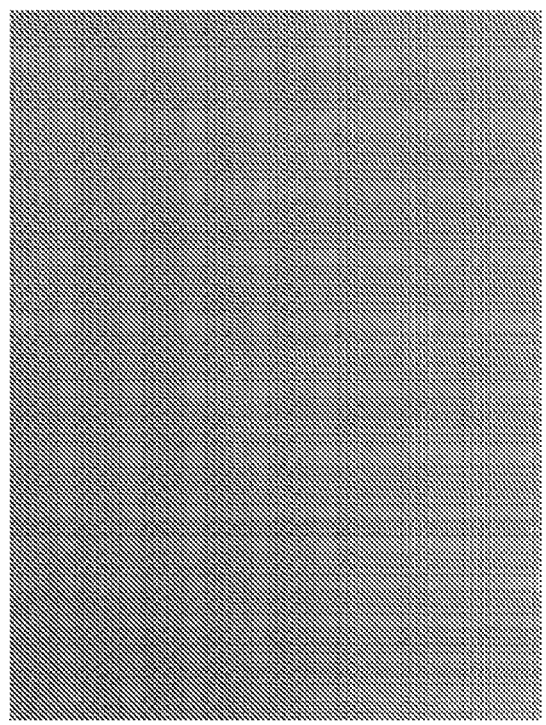

[FIG. 4-2]
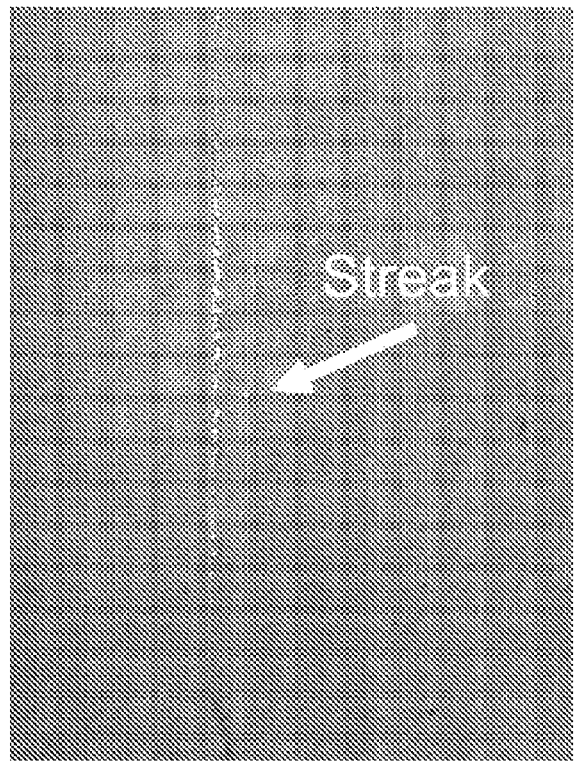
[FIG. 4-3]
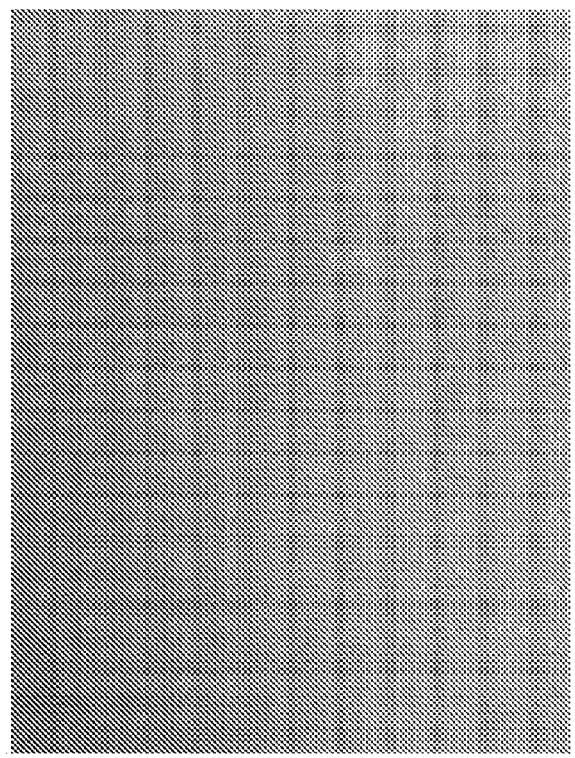

[FIG. 4-4]
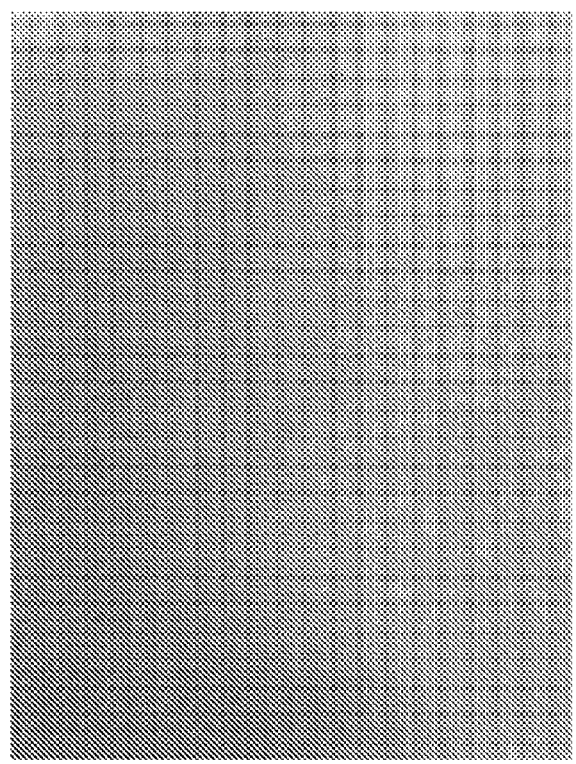

ORGANOPOLYSILOXANE CURED PRODUCT FILM AND USAGE, MANUFACTURING METHOD, AND MANUFACTURING APPARATUS THEREFOR

CROSS-REFERENCE TO RELATED APPLICATIONS

This application is the U.S. National Stage of International Application No. PCT/JP2020/005725 filed on 14 Feb. 2020, which claims priority to and all advantages of Japanese Application No. 2019-024428 filed on 14 Feb. 2019, the content of which is incorporated herein by reference.

TECHNICAL FIELD

The present invention relates to a thin and uniform organopolysiloxane cured film, along with a usage, manufacturing method, and manufacturing device therefor.

BACKGROUND ART

Organopolysiloxane cured products having a polysiloxane skeletal structure have excellent transparency, electrical insulation, heat resistance, cold resistance, and the like, can have improved electrical activity, if so desired, by introducing a high dielectric functional group such as a fluoroalkyl group or the like, and can be easily processed into a film or sheet. Therefore, the organopolysiloxane cured products used in various applications such as adhesive films used in various electric and electronic devices and electroactive films used in actuators and other transducer devices are classified into a hydrosilylation reaction curing type, condensation reaction curing type, peroxide curing type, and the like, based on the curing mechanism. Organopolysiloxane cured films using hydrosilylation reaction curing type curable organopolysiloxane compositions are widely used because they are quick curing when left at room temperature or heated, with no generation of byproducts.

In particular, organopolysiloxane cured films tend to require formability as a thin film, in addition to a high degree of uniformity, when used as an electronic material such as a touch panel or the like, an electronic component for a display device, and particularly as a transducer material for a sensor, actuator, or the like. In particular, there has been a strong demand in recent years for a thin film having organopolysiloxane cured products of 20 μm or less, in addition to having excellent flatness.

For example, the slot coating method such as that illustrated in FIG. 2 (reference drawing) is widely used for precision film manufacturing. However, due to the limited machining accuracy of machine tools, the eccentricity of backup rolls is approximately 2 μm and the film thickness of the film obtained therefrom may be non-uniform. The non-uniformity of the film derived from the eccentricity of backup rolls is unavoidable, even with precision grade bearings, simply by including the non-uniformity of the bearing. Here, in terms of the insulating pressure resistance and laminating accuracy of the organopolysiloxane cured film, the accuracy of the coating film thickness is preferably within 5%; however, since non-uniformity of approximately 2 μm is unavoidable, when the target film thickness is 20 μm, it becomes difficult during manufacturing to stably maintain the film thickness accuracy to within 5% when the film thickness error due to the eccentricity and bearing accuracy is 2 μm.

Meanwhile, a film forming method that uses solvent dilution is known for effects of reducing the viscosity of the coating solution, increasing wet film thickness, and the like, in order to mitigate the effect of mechanical precision and improve coating film thickness accuracy. As an example, the applicants of the present application have proposed a curable organopolysiloxane composition for forming a film containing a solvent, the viscosity and thixotropy of which are controlled, along with an organopolysiloxane cured film obtained by curing the curable organopolysiloxane composition (Patent Document 1). Such compositions are useful and effective in obtaining thin film-like organopolysiloxane cured products. However, when the curable organopolysiloxane composition for forming a film obtained by solvent dilution is molded into a thin film, depending on the selection of the solvent used for dilution, defects on the surface and inside of the film due to residual solvent, phase separation, or the like may occur. Therefore, when the film is precise and has excellent flatness and the film thickness of the target film is 20 μm or less, there is room for further improvement.

Meanwhile, in Patent Document 2, the applicants of the present application proposed providing a high dielectric film having excellent uniformity and flatness in the width direction of the film, an application thereof, and a method of manufacturing the film. However, although the film is effective in achieving an organopolysiloxane cured film with excellent flatness by suppressing thickness variation and unevenness, when the film thickness is 50 μm, it is difficult to stably coat the composition, while when the film thickness of the target film is 20 μm, there is still room for improvement.

Similarly, Patent Document 3 proposes that a thin silicone film having excellent flatness is obtained by conveying a web made of a carrier film such as a thermoplastic resin using a roll, then coating a curable silicone vertically onto the carrier using a slot die. However, in the present method, if the film thickness of the target film is 20 μm, the effects of mechanical precision due to the eccentricity of backup rolls and bearings described above and the problems of surface/internal defects of the film due to solvent use have not been completely solved, and therefore there is still room for improvement.

PRIOR ART DOCUMENTS

Patent Documents

Patent Document 1: Japanese Patent Application 2018-229642
Patent Document 2: International Patent Publication WO 2017/183541
Patent Document 3: Japanese Unexamined Patent Application Publication No. 2016-500382

SUMMARY OF THE INVENTION

Problems to be Solved by the Invention

In order to solve the aforementioned problem, an object of the present invention is to provide: an organopolysiloxane cured film with a target film thickness of 20 μm or less and excellent flatness and uniformity, along with a usage and a manufacturing method therefor.

Means for Solving the Problems

As a result of diligent research to solve the above problems, the present inventors have found that an organopolysiloxane cured film in which an arithmetic average height (Sa) of the film surface is less than 0.50 μm, while an average thickness at the center of the film is within a range of 1 to 20 μm, along with a method for manufacturing the organopolysiloxane cured film including a die coating step in which a slot die is used to coat a curable organopolysiloxane composition on a continuously traveling substrate supported between a pair of support rolls by means of a tension support system, can solve the above problems, thereby allowing the present inventors to arrive at the present invention.

In other words, the object of the present invention is achieved by:

[1] An organopolysiloxane cured film in which the arithmetic average height (Sa) of the film surface is less than 0.50 μm, while the average thickness at the center of the film is within a range of 1 to 20 μm. Note that, regarding the width direction of the film, the difference between the thickness of the terminal and the thickness of the center of the film is preferably within 5.0%.

[2] The organopolysiloxane cured film according to [1], wherein the average thickness at the center of the film is within a range of 1 to 10 μm.

[3] The organopolysiloxane cured film according to [1] or [2], wherein the film is substantially free of organic solvents. Note that the film being substantially free of organic solvent means that the film is a cured film obtained by curing a solvent-free type curable organopolysiloxane composition; alternatively, the content of the organic solvent in the entire cured film is made less than 0.1 mass % by sufficiently removing the organic solvent remaining during curing.

[4] The organopolysiloxane cured film according to any one of [1] to [3], which is obtained by curing a curable organopolysiloxane composition containing:
(A) an organopolysiloxane with a curing reactive group having at least two carbon-carbon double bonds in one molecule;
(B) an organohydrogenpolysiloxane having at least two silicon-bonded hydrogen atoms in the molecule (in an amount within a range in which the amount of silicon-bonded hydrogen atoms in component is 0.1 to 2.5 mol per 1 mol of carbon-carbon double bonds in the composition); and
(C) an effective amount of a hydrosilylation reaction catalyst.

[5] The organopolysiloxane cured film according to [4], wherein a portion or all of component (A) or component (B) is an organopolysiloxane or an organohydrogenpolysiloxane, having a high dielectric functional group.

[6] The organopolysiloxane cured film according to [4] or [5], wherein the curable organopolysiloxane composition further includes:
(D1) reinforcing fine particles or a composite thereof having an average BET specific surface area of greater than 100 $m^2/g$ that are surface treated with one or more types of organic silicon compounds; and
(D2) reinforcing fine particles or a composite thereof having an average BET specific surface area within a range of 10 to 100 $m^2/g$ that are surface treated with one or more types of the organic silicon compounds, and
wherein the mass ratio of component (D1) and component (D2) is within a range of 50:50 to 99:1.

[7] The organopolysiloxane cured film according to any one of [4] to [6], wherein the curable organopolysiloxane composition is a solvent-free or low-solvent type composition.

Moreover, the object of the present invention is achieved by the following invention.

[8] The use of the organopolysiloxane cured film according to any one of [1] to [7] as an electronic material or as a member for a display device.

[9] A laminated body having a structure in which the organopolysiloxane cured film according to any one of [1] to [7] is laminated onto a sheet-like substrate provided with a release layer.

[10] An electronic component or display device, having the organopolysiloxane cured film according to any one of [1] to [7].

Furthermore, the object of the present invention is achieved by the invention of a method of manufacturing the organopolysiloxane cured film.

[11] A manufacturing method for the organopolysiloxane cured film according to any one of [1] to [7], comprising a die coating step in which a slot die is used to coat a curable organopolysiloxane composition on a continuously traveling substrate supported between a pair of support rolls by means of a tension support system.

[12] The manufacturing method for the organopolysiloxane cured film according to [11], wherein the substrate is a film-like substrate having a release layer.

[13] The manufacturing method for the organopolysiloxane cured film according to [11] or [12], including a step involving coating the curable organopolysiloxane composition using the slot die onto the substrate, then curing the curable organopolysiloxane composition.

[14] The manufacturing method for the organopolysiloxane cured film according to any one of [11] to [13], wherein the curable organopolysiloxane composition is a multi-component composition, further including a mixing step for preparing the curable organopolysiloxane composition by mixing each component via a stirring device using mechanical force, as a pre-step to feeding the curable organopolysiloxane composition into the slot die.

[15] The manufacturing method for the organopolysiloxane cured film according to [14], wherein the stirring device using mechanical force is a static mixer and the mixing step for preparing the curable organopolysiloxane composition and the step involving feeding the curable organopolysiloxane composition into the slot die are continuous.

[16] The manufacturing method for the organopolysiloxane cured film according to any one of [11] to [15], wherein the curable organopolysiloxane composition is a solvent-free or low-solvent type composition that does not include a step involving dilution with a solvent.

[17] The manufacturing method for the organopolysiloxane cured film according to any one of [11] to [16], including a step involving curing the curable organopolysiloxane composition in a state sandwiched between separators having the release layer.

[18] A manufacturing device for the organopolysiloxane cured film according to any one of [1] to [7], the manufacturing device including:
at least one pair of support rolls;
a continuously traveling substrate supported between the pair of support rolls by means of a tension support system;
a slot die for coating a curable organopolysiloxane composition on the substrate; and
a stirring and mixing device using mechanical force provided with a means for feeding the curable organopolysiloxane composition into the slot die.

Effects of the Invention

The present invention can provide: an organopolysiloxane cured film which can be made thin, is significantly flat, and has very few defects on the surface and inside of the film, in addition to exhibiting high dielectric breakdown strength with regard to a load voltage; along with a usage and a manufacturing method therefor. In particular, via a manufacturing method for the organopolysiloxane cured film including a die coating step in which a slot die is used to coat a curable organopolysiloxane composition on a continuously traveling substrate supported between a pair of support rolls by means of a tension support system, it is possible to provide a high-precision thin film that has a film thickness of 20 μm or less and is substantially free from the problems of the effects of mechanical precision due to the eccentricity of backup rolls and bearings as well as surface/internal defects of the film due to solvent use.

The organopolysiloxane cured film has various excellent properties expected of a silicone material, such as handling workability, transparency, heat resistance, and the like, is a film or sheet-like member suitable as an adhesive layer or dielectric layer of an electronic component or the like, and may function as a gel, an elastomer, or for optical bonding, or the like. More preferably, the organopolysiloxane cured film can be used as a film or sheet-like member with excellent dielectric breakdown strength when made into a thin film and under high voltage in applications as an electronic material, an electronic member for display devices such as touch panels or the like, a transducer material such as an actuator, or the like.

BRIEF DESCRIPTION OF THE DRAWINGS

FIG. 1 illustrates a schematic view of a coating device according to an embodiment of the present invention.

FIG. 2 illustrates a schematic view of a coating device different from the manufacturing method of the present invention as a comparative view.

FIG. 3 illustrates a schematic view of the feed to a slot die using a stirring device according to an embodiment of the present invention.

FIG. 4-1 illustrates a photograph (homogeneous mirror surface) of the organopolysiloxane cured film produced in Example 1.

FIG. 4-2 illustrates a photograph (with a streak) of the organopolysiloxane cured film produced in Comparative Example 1.

FIG. 4-3 illustrates a photograph (homogeneous mirror surface) of the organopolysiloxane cured film produced in Example 2.

FIG. 4-4 illustrates a photograph (homogeneous mirror surface) of the organopolysiloxane cured film produced in Example 3.

DETAILED DESCRIPTION OF INVENTION

The organopolysiloxane cured film of the present invention is described in detail below.

[Thickness, Uniformity, and Flatness]

The organopolysiloxane cured film of the present invention is a thin film, with the average thickness of the film being within a range of 1 to 20 μm, preferably 1 to 15 μm, and more preferably 1 to 10 μm. Herein, the average thickness of the film is the average value of the thickness at the center of the film. Preferably, the organopolysiloxane cured film is uniform and flat, with the difference between the thickness at one end and the thickness at the center being within 5.0% in the width direction of the film. The average value of the thickness of the center of the film is more preferably within a range of 5 to 200 μm. The width direction of the film is the direction orthogonal to the length direction of the film and generally refers to the direction orthogonal in the planar direction with regard to the direction in which a curable organopolysiloxane composition, which is a raw material, is coated onto a substrate. Note that when the film is rolled, the rolling direction is the length direction, while the width direction of the film is the direction orthogonal thereto. For a quadrilateral or essentially quadrilateral film, the width direction of the film may be the direction orthogonal to the long axis direction, while for a square or essentially square film, the width direction may either be the direction orthogonal or the direction parallel to any side of the square film.

The organopolysiloxane cured film of the present invention is characterized by having a smooth flat surface and significantly little surface roughness. Specifically, it is particularly preferable that the average value of the arithmetic average height (Sa), which is the surface roughness of the same film surface, be less than 0.50 μm, with Sa being within a range of 0.01 to 0.50 μm, within a range of 0.05 to 0.40 μm, and within a range of 0.07 to 0.35 μm. Note that the arithmetic average height (Sa) of the film surface is the average value of the value measured at any point on the film surface measured using a laser microscope or the like, with Sa particularly preferably being within the range described above at each point. Moreover, when the organopolysiloxane cured film of the present invention is visually observed, the film surface is preferably smooth to the extent that the film surface exhibits a mirror shape.

More specifically, Sa measurement in the present invention was performed using a laser microscope "LEXT OLS4100" equipped with laser light having a wavelength of 405 nm manufactured by Olympus and an objective lens MPLAPONLEXT 50×. More specifically, using the same laser microscope, any surface region of approximately 1 mm×1 mm on the organopolysiloxane cured film, which is the measurement surface, was taken as the measuring range, wherein the measurement (n=2) was taken in two regions, from which the individual values and average values were taken. Note that in the organopolysiloxane cured film of the present invention, the arithmetic average height (Sa), which is the surface roughness of the same film surface, is preferably less than 0.50 μm for both the average value of n=2 and the individual measurements, with each Sa more preferably being within the range described above. Specifically, it is particularly preferable that the Sa in two regions of the same film surface both be within the range of 0.07 to 0.35 μm.

Moreover, the organopolysiloxane cured film of the present invention has a difference (absolute value) between the thickness (μm) of one end and the thickness (μm) of the center within 5.0%, preferably within 4.0%, and particularly preferably within 3.5% in the width direction of the film. Note that the film is preferably a flat and uniform structure with essentially no unevenness on the surface, including rises at both ends. The maximum displacement (difference) of the thickness in the film width direction is preferably within 5.0%. The film is particularly preferably flat, with essentially no unevenness, and having a maximum displacement (difference) of the thickness of the entire film within 5.0%. In particular, in addition to the smoothness of the surface, a flat film is advantageously less prone to bubble entrainment, deformation, and defects originating from unevenness between the films when not just a single layer but rather a plurality of film layers are overlaid to form a uniform thick film layer.

The organopolysiloxane cured film of the present invention has an average thickness per film within a range of 1 to 20 μm; however, a plurality of films can be overlaid to form a laminated film exceeding 20 μm, which can be used to form an adhesive layer or dielectric layer. In particular, a dielectric film forming a dielectric layer obtained by laminating two or more films is included in the scope of the present invention.

As described above, the organopolysiloxane cured film of the present invention has an arithmetic average height (Sa) of the film surface of less than 0.50 μm and an average thickness at the center of the film within the range of 1 to 20 μm, and is a thin flat film with a significantly smooth surface. When the arithmetic average height (Sa) of the film surface is less than 0.50 μm, the film surface is smooth so as to exhibit a mirror shape when visually observed. The manufacturing method for a known organopolysiloxane cured film was difficult to achieve due to mechanical precision, however, by adopting a manufacturing method for the organopolysiloxane cured film including a die coating step in which a slot die is used to coat a curable organopolysiloxane composition on a continuously traveling substrate supported between a pair of support rolls by means of a tension support system described later, such an organopolysiloxane cured film can be easily obtained. Furthermore, according to this manufacturing method, problems with defects on the surface/interior of the film associated with the use of the solvent can be resolved at the same time, allowing a thin layer flat and high-quality organopolysiloxane cured film to be obtained.

[Film Size]

The organopolysiloxane cured film of the present invention is preferably of a certain size (area). The film width is preferably 30 mm or more, while the film area is preferably 900 mm² or more. The film is, for example, an organopolysiloxane cured film with a size that is 30 mm square or larger. Meanwhile, the organopolysiloxane cured film of the present invention may have a structure in which a curable composition of a raw material is uniformly coated and cured even on a release layer, allowing it to be used without limitation in the length direction, even at a length in which rolling is possible on a roll. Furthermore, it goes without saying that the organopolysiloxane cured film can be used by cutting into a desired size and shape.

[Defects on Surface/Interior of Film]

Although the organopolysiloxane cured film of the present invention is thin and flat, defects on the surface and inside of the film can preferably be significantly reduced at an arbitrary point on the film. In particular, by employing the manufacturing method of the present invention, a flat organopolysiloxane cured film having a thickness of 20 μm or less can be obtained without substantially using a solvent; moreover, an organopolysiloxane cured film having high quality and high dielectric breakdown strength with significantly small defects on the surface and interior of the film derived from residual solvents, phase separation, or the like can be realized.

[Number of Surface Defects on Film]

The organopolysiloxane cured film of the present invention, in addition to the above surface smoothness, preferably has significantly few defects on the film surface at arbitrary points on the film. Herein, a defect on the film surface is a contamination site on the film surface due to voids originating from air bubbles and the adhesion of dust, airborne dust, and the like. If a large number of defects is present, the uniformity of the film surface is impaired and microscopic defects are generated, potentially causing dielectric breakdown at the site, particularly when the film is electrified by applying a high voltage. Note that surface defects, particularly fine voids with diameters of several to several tens of μm, may be difficult to visually confirm.

Specifically, the number of surface defects of the organopolysiloxane cured film of the present invention is within a range of 0 to 1, preferably 0 to 0.5, and more preferably 0 to 0.1 when measuring the number of surface defects using optical means at an arbitrary position on the film with a unit area of 15 mm×15 mm. When the number of surface defects exceeds the aforementioned upper limit, dielectric breakdown is more likely to occur when the film is electrified by applying a high voltage, thereby significantly reducing the dielectric breakdown strength of the entire film.

Herein, the measurement of the number of defects using optical means is a method in which light is irradiated from a light source having a certain level of illuminance onto the surface at a certain angle of incidence, then the reflected light is detected by an optical means such as a CCD camera or the like, with points having a certain signal threshold counted as surface defects. Specifically, light is irradiated from a white LED light source installed at a position that is a certain distance (for example, 50 to 300 mm) from the film at a specific angle of incidence (for example, 10 to 60 degrees) such that the illuminance at a film position is constant. The specular reflected light (light reflected at a reflection angle corresponding to the angle of incidence) is detected by a CCD camera having a 10 μm pixel size resolution at a scanning speed of 10 m/minute, installed at a position that is a certain distance (for example, 50 to 400 mm) from the film. The detected signal is differentiated in the scanning direction, so the number of defects having a specific signal threshold can be counted across the entire film roll and then converted into a number of defects within a range of the film with a unit area of 15 mm×15 mm. For example, the number of defects on the film surface can be identified by irradiating light from a white LED light source having a specific surface incidence angle onto the organopolysiloxane cured film and detecting the reflected light using a MaxEye.Impact (with a line speed of 10 m/min and resolution of 0.01 mm/scan), manufactured by Futec Inc.

[Number of Internal Defects in Film]

The organopolysiloxane cured film of the present invention is a thin film, so the number of defects inside the film is also preferably suppressed. Specifically, the number of internal defects is within a range of 0 to 20, preferably 0 to 15 when measuring the number of internal defects using an optical means at an arbitrary position on the film with a unit area of 15 mm×15 mm. When the number of internal defects exceeds the aforementioned upper limit, dielectric breakdown is more likely to occur when the film is electrified by applying a high voltage, thereby significantly reducing the dielectric breakdown strength of the entire film.

Similar to defects of the film surface, the number of internal defects can be identified by measuring the number of defects using an optical means. In this case, unlike measuring surface defects, light is irradiated orthogonal to the lower portion of the film surface from a light source having a certain level of illuminance, then the transmitted light is detected by an optical means such as a CCD camera or the like, with points having a certain signal threshold counted as surface defects. For example, the number of defects inside the film can be identified by irradiating light from a white LED light source so as to pass through the film in an orthogonal (directly above) direction from the lower portion of the organopolysiloxane cured film, then detecting the transmitted light using a MaxEye.Impact (with a line speed of 10 m/min and resolution of 0.01 mm/scan), manufactured by Futec Inc.

[Transparency]

The organopolysiloxane cured film of the present invention is essentially transparent when no coloring agent, filler of a large particle size, or the like is added, allowing it to be used as a dielectric layer or adhesive layer in applications requiring transparency/visibility. Herein, "essentially transparent" means that a cured product forming a film with an average thickness of 1 to 20 μm is visually transparent and the transmittance of light at a wavelength of 450 nm is 80% or higher, based on a value for air of 100%. In the present invention, a preferred organopolysiloxane cured film is a thin film that is highly transparent, preferably having an average thickness within a range of 1 to 15 μm, more preferably within a range of 1 to 10 μm, and particularly preferably a light transmittance of 90% or higher.

[Dielectric Breakdown Strength]

As described above, the organopolysiloxane cured film of the present invention has very few defects inside and on the surface. Therefore, even when a high voltage is applied to the film, a dielectric breakdown phenomenon caused by overvoltage due to voids and dust in the film, which are defects, is prevented from occurring. As a result, a high dielectric breakdown strength can be achieved. Note that "dielectric breakdown strength" in the present specification is a measure of the dielectric breakdown resistance of the film under an applied direct current or alternating current voltage, wherein the dielectric breakdown strength value or dielectric breakdown voltage value is obtained by dividing the applied voltage prior to dielectric breakdown by the thickness of the film. In other words, the dielectric breakdown strength in the present invention is measured in units of potential difference with regard to the units of film thickness (in the present invention, Volt/micrometer (V/μm)). The dielectric breakdown strength can be measured by an electrical insulating oil breakdown voltage testing device (for example, Portatest 100A-2 manufactured by Soken Co., Ltd., or the like) having a program conforming to a standard such as JIS 2101-82 or the like. At this time, in order to avoid variations in the measurement value of the dielectric breakdown strength at an arbitrary position of the film, the dielectric breakdown strength is measured in at least 10 arbitrary positions on the film and the standard deviation value is preferably sufficiently low.

Specifically, the organopolysiloxane cured film of the present invention has a dielectric breakdown strength measured at room temperature that is within a range of 60 V/μm to 200 V/μm, and more preferably 70 V/μm to 100 V/μm. If the number of film surface and internal defects exceeds the aforementioned upper limit, the aforementioned dielectric breakdown strength may not be achieved. Furthermore, the entire organopolysiloxane cured film of the present invention is uniform, containing almost no microscopic defects. Therefore, the standard deviation value of the dielectric breakdown strength is sufficiently low, within a range of 0.1 to 10.0 V/μm, and preferably 0.1 to 5.0 V/μm. When the number of film surface and internal defects exceeds the aforementioned upper limit, variations in the number of defects inside and on the surface of the film may increase, potentially resulting in cases in which the standard deviation value of the dielectric breakdown strength may exceed 10.0 V/μm. Thus, reliability of the obtained organopolysiloxane cured film is reduced.

[Specific Dielectric Constant]

In the organopolysiloxane cured film of the present invention, a high dielectric functional group such as a fluoroalkyl group or the like may be optionally introduced and the specific dielectric constant of the entire film at 1 kHz and 25° C. can be easily designed to be 3 or higher. The specific dielectric constant can be designed according to the number of high dielectric functional groups introduced, use of a high dielectric filler, or the like, allowing an organopolysiloxane cured film having a specific dielectric constant of 4 or higher, 5 or higher, or 6 or higher to be relatively easily obtained.

[Mechanical Properties]

The organopolysiloxane cured film of the present invention is characterized by being thin and flat, preferably having a low number of microscopic surface and internal defects, with macroscopic mechanical properties such as hardness, tear strength, tensile strength, and the like that are generally comparable to those of an organopolysiloxane cured film designed with similar chemical composition, film thickness, and shape. As an example, the organopolysiloxane cured product can be designed to have the following mechanical properties measured when heated and molded into a sheet having a thickness of 2.0 mm, based on JIS K 6249.

(1) The Young's modulus (MPa) at room temperature is 10 MPa or less, particularly preferably within a range of 0.1 to 2.5 MPa.

(2) The tear strength (N/mm) at room temperature is 1 N/mm or higher, particularly preferably within a range of 2 N/mm or higher.

(3) The tensile strength (MPa) at room temperature is 1 MPa or higher, particularly preferably within a range of 2 MPa or higher.

(4) The elongation at break (%) is 200% or higher, particularly preferably within a range of 200 to 1000%.

When the organopolysiloxane cured film of the present invention is used in an application as an electronic material such as a touch panel and the like, electronic member for a display device, and particularly a transducer material such as a sensor or the like, the shear storage modulus at 23° C. is preferably within a range of $10^3$ to $10^5$ Pa, more preferably $1.0 \times 10^3$ to $5.0 \times 10^4$ Pa.

Regarding other mechanical properties, the compressive residual strain (%) of the organopolysiloxane cured film is preferably less than 10%, more preferably less than 5%, and particularly preferably 4% or less. However, the organopolysiloxane cured film of the present invention can be designed as a material having a compressive residual strain (%) that is less than 3%.

Similarly, the organopolysiloxane cured film of the present invention preferably has a compression ratio (%) of 15% or higher, more preferably 18% or higher, and particularly preferable 20% or higher.

[Pressure-Sensitive Adhesive Strength]

When used as an adhesive or adhesive layer, the organopolysiloxane cured film of the present invention may be designed such that a desired pressure-sensitive adhesive strength is provided using an organopolysiloxane resin or the like. For example, using the curable organopolysiloxane composition for forming the organopolysiloxane cured film, an organopolysiloxane cured film having a thickness of 100 μm is prepared and a test piece in which a polyethylene terephthalate (PET) substrate (thickness of 50 μm) is adhered to both sides thereof is subjected to an environment of 23° C. and 50% humidity, such that, when peeled off at a rate of 300 mm/min at an angle of 180 degrees, the peeling force can be designed to be 5 N/m or more, or 10 N/m or more. Note that in practical use, if a pressure-sensitive adhesive strength can be provided to the substrate with the adhered organopolysiloxane cured film of the present invention, based on various treatments, or if an adhesive layer is not used, it goes without saying that the pressure-sensitive adhesive strength will be essentially nonexistent, allowing an easily peelable organopolysiloxane cured film to be used.

[Organopolysiloxane Cured Product]

The organopolysiloxane cured product of the present invention is obtained by curing a curable organopolysiloxane composition so as to have the aforementioned thickness. The curing reaction mechanism is not particularly limited, but may include, for example: a hydrosilylation reaction curing type via an alkenyl group and a silicon atom-bonded hydrogen atom; a dehydration condensation reaction curing type or a dealcoholization condensation reaction curing type via a silanol group and/or a silicon atom-bonded alkoxy group; a peroxide curing reaction type using an organic peroxide; and a radical reaction curing type via high energy ray irradiation to a mercapto group or the like, wherein it is desirable to use a hydrosilylation reaction curing type, a peroxide curing reaction type, a radical reaction curing type or a combination thereof since it can be cured relatively quickly and the reaction can be easily controlled. These curing reactions proceed with heating, irradiating with high energy radiation, or a combination thereof.

In particular, an organopolysiloxane cured film having a film thickness of 20 μm or less, a film thickness accuracy of 5% or less, and preferably having significantly small film surface and internal defects can be obtained using a manufacturing method described later, so a hydrosilylation reaction curing type curable organopolysiloxane composition is preferably used in the present invention.

Advantageously, the film is an organopolysiloxane cured film, which is obtained by curing a curable organopolysiloxane composition containing: (A) an organopolysiloxane with a curing reactive group having at least two carbon-carbon double bonds in one molecule;
(B) an organohydrogenpolysiloxane having at least two silicon-bonded hydrogen atoms in the molecule (in an amount within a range in which the amount of 1 mol of alkenyl groups in the composition is 0.1 to 2.5 mol per 1 mol of carbon-carbon double bonds in the composition); and
(C) an effective amount of a hydrosilylation reaction catalyst.

Component (A) of the present invention is particularly preferably an organopolysiloxane mixture containing:
(a1) a straight chain or branched chain organopolysiloxane having an alkenyl group only at an end of a molecular chain; and
(a2) an organopolysiloxane resin containing an alkenyl group having at least one branched siloxane unit in a molecule with an amount of vinyl ($CH_2=CH-$) groups within a range of 1.0 to 5.0 mass %.

The aforementioned component (A) is an organopolysiloxane having a curing reactive group containing a carbon-carbon double bond, with examples including organopolysiloxanes in straight chain, branched chain, cyclic, or resin (network) organopolysiloxanes containing a curing reactive group in a molecule, selected from among: vinyl groups, allyl groups, butenyl groups, pentenyl groups, hexenyl groups, heptenyl groups, octenyl groups, nonenyl groups, decenyl groups, undecenyl groups, dodecenyl groups, and other alkenyl groups with 2 to 20 carbon atoms; 3-acryloxypropyl groups, 4-acryloxibutyl groups, and other groups containing an acryl; and 3-methacryloxypropyl groups, 4-methacryloxibutyl groups, and other groups containing a methacryl group. An organopolysiloxane having a curing reactive group containing a carbon-carbon double bond, selected from among vinyl groups, allyl groups, and hexenyl groups is particularly preferable.

The organopolysiloxane serving as component (A) may contain a group selected from among monovalent hydrocarbon groups that do not have a carbon-carbon double bond in a molecule, hydroxyl groups, and alkoxy groups. Furthermore, a portion of the hydrogen atoms of the monovalent hydrocarbon group may be substituted with a halogen atom or a hydroxyl group. Exemplary monovalent hydrocarbon groups include: alkyl groups such as methyl groups, ethyl groups, propyl groups, butyl groups, pentyl groups, hexyl groups, heptyl groups, octyl groups, nonyl groups, decyl groups, undecyl groups, and dodecyl groups; aryl groups such as phenyl groups, tolyl groups, xylyl groups, naphthyl groups, anthracenyl groups, phenanthryl groups, pyrenyl groups, and the like; aralkyl groups such as benzyl groups, phenethyl groups, naphthyl ethyl groups, naphthyl propyl groups, anthracenyl ethyl groups, phenanthryl ethyl groups, pyrenyl ethyl groups, and the like; and groups in which a hydrogen atom of these aryl groups or aralkyl groups is substituted with a methyl group, ethyl group, or other alkyl group, a methoxy group, ethoxy group, or other alkoxy group, or halogen atom such as a chlorine atom, bromine atom, or the like. Note that when component (A) contains a hydroxyl group or the like, the component has condensation reactivity in addition to hydrosilylation reaction curability.

Preferably, component (A) may be an organopolysiloxane represented by the following average composition formula:

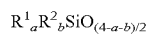

or a mixture thereof.

In the formula, $R^1$ represents a curing reactive group containing a carbon-carbon double bond,
$R^2$ represents a group selected from monovalent hydrocarbon groups that do not have a carbon-carbon double bond, hydroxyl groups, and alkoxy groups, and
a and b represent numbers satisfying the following conditions: $1 \leq a+b \leq 3$ and $0.001 \leq a/(a+b) \leq 0.33$, preferably numbers satisfying the following conditions: $1.5 \leq a+b \leq 2.5$ and $0.005 \leq a/(a+b) \leq 0.2$. This is because the flexibility of the cured product increases when a+b are above the lower limit of the aforementioned range, while the mechanical strength of the cured product increases when a+b are below the upper limit of the range. Therefore, the mechanical strength of the cured product increases when a/(a+b) is above the lower limit of the range, while flexibility of the cured product increases when a/(a+b) is below the upper limit of the range.

The component (A) of the present invention is particularly preferably an organopolysiloxane mixture containing:
(a1) a straight chain or branched chain organopolysiloxane having an alkenyl group only at the end of a molecular chain, and
(a2) an organopolysiloxane resin containing an alkenyl group having at least one branched siloxane unit in a molecule with an amount of vinyl ($CH_2=CH-$) groups within a range of 1.0 to 5.0 mass %.

Component (a1) is a straight chain or branched chain organopolysiloxane having a siloxane unit represented by

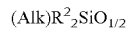

(wherein, Alk represents an alkenyl group having two or more carbon atoms) at the end of a molecular chain, and wherein other siloxane units are essentially only a siloxane unit represented by $R^2{}_2SiO_{2/2}$. Note that $R^2$ represents the same group as described above. Furthermore, the degree of siloxane polymerization of component (A1-1) is within a range of 7 to 1002 including terminal siloxane units, but may be within a range of 102 to 902. Such a component (A1-1) is particularly preferably a straight chain organopolysiloxane in which both ends of the molecular chain are blocked with a siloxane unit represented by $(Alk)R^2{}_2SiO_{1/2}$.

The component (a2) is an alkenyl group-containing organopolysiloxane resin. Average unit formula:

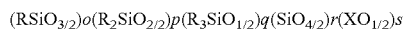

$(RSiO_{3/2})o(R_2SiO_{2/2})p(R_3SiO_{1/2})q(SiO_{4/2})r(XO_{1/2})s$

The alkenyl group-containing organopolysiloxane resin represented above is exemplified. In the formula, R represents a group selected from alkenyl groups and monovalent hydrocarbon groups that do not have a carbon-carbon double bond, while X represents a hydrogen atom or an alkenyl group having 1 to 3 carbon atoms. However, of all Rs, R is an alkenyl group at least within a range in which the amount of vinyl ($CH_2=CH-$) groups in the organopolysiloxane resin satisfies a range of 1.0 to 5.0 mass %, and at least a portion of Rs in the siloxane unit represented by $RSiO_{1/2}$ are particularly preferably alkenyl groups.

In the formula, (o+r) is a positive integer, p is 0 or a positive integer, q is 0 or a positive integer, s is 0 or a positive integer, p/(o+r) is a number within a range of 0 to 10, q/(o+r) is a number within a range of 0 to 5, (o+r)/(o+p+q+r) is a number within a range of 0.3 to 0.9, and s/(o+p+q+r) is a number within a range of 0 to 0.4.

As the component (a2), the alkenyl group-containing MQ organopolysiloxane resin represented below is particularly preferably exemplified.

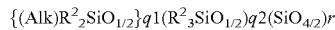

$\{(Alk)R^2{}_2SiO_{1/2}\}q1(R^2{}_3SiO_{1/2})q2(SiO_{4/2})r$ (in the formula, Alk and $R^2$ are the same groups as described above, while q1+q2+r is a number within the range of 50 to 500, (q1+q2)/r is a number within the range of 0.1 to 2.0, and q2 is the number within the range in which the content of vinyl ($CH_2=CH-$) groups in the organopolysiloxane resin satisfies the range of 1.0 to 5.0 mass %.)

Using component (a1) with an alkenyl group only at an end of the molecular chain and component (a2) as an organopolysiloxane resin, having a certain number of alkenyl groups can provide a curing reaction product with excellent curability as an overall composition and having excellent flexibility and mechanical strength, in addition to being able to provide an organopolysiloxane cured film that is particularly suitable for an adhesive layer or dielectric layer in the aforementioned electronic components and the like.

Component (B) is an organohydrogenpolysiloxane having at least two silicon-bonded hydrogen atoms in a molecule and is a component that functions as a crosslinking agent for component (A).

Examples of component (B) include 1,1,3-3-tetramethyldisiloxane, 1,3,5,7-tetramethyl cyclotetrasiloxane, tris(dimethylhydrogensiloxy)methylsilane, tris(dimethylhydrogensiloxy)phenylsilane, methylhydrogenpolysiloxanes blocked at both ends of a molecular chain with a trimethylsiloxy group, dimethylsiloxane/methylhydrogensiloxane copolymers blocked at both ends of a molecular chain with a trimethylsiloxy group, dimethylpolysiloxane blocked at both ends of a molecular chain with a dimethylhydrogensiloxane group, dimethylsiloxane/methylhydrogensiloxane copolymers blocked at both ends of a molecular chain with a dimethylhydrogensiloxane group, methylhydrogensiloxane/diphenylsiloxane copolymers blocked at both ends of a molecular chain with a trimethylsiloxy group, methylhydrogensiloxane/diphenylsiloxane/dimethylsiloxane copolymers blocked at both ends of a molecular chain with a trimethylsiloxy group, hydrolytic condensates of a trimethylsilane, copolymers containing $(CH_3)_2HSiO_{1/2}$ units and $SiO_{4/2}$ units, copolymers containing $(CH_3)_2HSiO_{1/2}$ units, $SiO_{4/2}$ units, and $(C_6H_5)SiO_{3/2}$ units, and mixtures of two or more types thereof.

The amount of component (B) used is preferably an amount in which the silicon-bonded hydrogen atoms are within a range of 0.1 to 10 mols, more preferably 0.1 to 5.0 mols, and particularly preferably 0.1 to 2.5 mols, with regard to 1 mol of carbon-carbon double bonds in component (A) of the composition. Using an amount of component (B) that is less than the lower limit may cause curing defects. When the amount of component (B) exceeds the upper limit, the mechanical strength of the cured product may be too high and the desired physical properties of an adhesive layer or dielectric layer may not be obtainable. However, in order to improve the adhesive strength of the organopolysiloxane cured film of the present invention to glass or other adherend or the like, the use of silicon-bonded hydrogen atoms in a range exceeding 20 mols with regard to 1 mol of carbon-carbon double bonds in component (A) is not hindered.

Component (C) is a catalyst that promotes a hydrosilylation reaction between component (A) and component (B). Examples include platinum based catalysts, rhodium based catalysts, palladium based catalysts, nickel based catalysts, iridium based catalysts, ruthenium based catalysts, and iron based catalysts. Platinum based catalysts are preferable. Examples of platinum based catalyst include platinum based compounds, such as platinum fine powders, platinum black, platinum-supporting silica fine powders, platinum-supporting activated carbon, chloroplatinic acids, alcohol solutions of chloroplatinic acids, olefin complexes of platinum, alkenylsiloxane complexes of platinum, and the like. Alkenylsiloxane complexes of platinum are particularly preferable. Exemplary alkenylsiloxanes include: 1,3-divinyl-1,1,3,3-tetramethyldisiloxane; 1,3,5,7-tetramethyl-1,3,5,7-tetravinylcyclotetrasiloxane; alkenyl siloxanes obtained by substituting a portion of the methyl groups of the alkenylsiloxanes with an ethyl group, a phenyl group, or the like; and alkenylsiloxanes obtained by substituting a portion of the vinyl groups of these alkenylsiloxanes with an allyl group, a hexenyl group, or the like. The platinum-alkenyl siloxane complex has favorable stability, so 1,3-divinyl-1,1,3,3-tetramethyldisiloxane is particularly preferable. Furthermore, the stability of the platinum-alkenylsiloxane complex can be improved. Therefore, 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane, or other alkenylsiloxane or dimethylsiloxane oligomers or other organosiloxane oligomers are preferably added to the complex, with an alkenylsiloxane particularly preferably added to the complex.

The amount of component (C) used is an effective amount and is not particularly limited so long as the amount promotes curing of the curable organopolysiloxane composition of the present invention. Specifically, in mass units, metal atoms in the catalyst are of an amount within a range of 0.01 to 1,000 ppm, and preferably, the platinum metal atoms in component (C) are of an amount within a range of 0.1 to 500 ppm, with regard to the sum (100 mass % as a whole) of components (A) to (C). This is because when the amount of component (C) is less than the lower limit of the aforementioned range, curing may be insufficient. Moreover, exceeding the upper limit of the range may be uneconomical and potentially adversely affect transparency, such as by coloring of the obtained cured product and the like.

[Reinforcing Filling Materials (D1), (D2)]

The curable organopolysiloxane composition according to the present invention preferably contains reinforcing fine particles or a composite thereof, which are surface treated with one or more types of organic silicon compounds and have different average BET specific surface areas within a certain range relative to the sum of components forming a non-volatile solid fraction via a curing reaction in the composition.

Herein, in terms of the mechanical strength of the cured product, one or more types of reinforcing fine particles having an average primary particle size of less than 50 nm is preferred. Examples include fumed silica, wet silica, pulverized silica, calcium carbonate, diatomaceous earth, finely pulverized quartz, various metal oxide powders other than alumina and zinc oxides, glass fibers, carbon fibers, and the like, with those treated with one or more types of organic silicon compounds described below used. The shape thereof is not particularly limited, with arbitrary shapes including a particle shape, plate shape, needle shape, fibrous shape, and the like capable of being used.

Preferred examples thereof include hydrophilic or hydrophobic fumed silica or metal oxide composites thereof, which have an average primary particle size of 10 nm or less, are partially aggregated, and have BET specific surface areas that are mutually different as described later in terms of improving mechanical strength. Furthermore, in terms of improving dispersibility, the fumed silica or metal oxide composite thereof is preferably treated with silazane or a silane coupling agent described later. Two or more types of the reinforcing inorganic particles may be used in combination.

In the present invention, the reinforcing filler includes:
(D1) reinforcing fine particles or a composite thereof having an average BET specific surface area of greater than 100 m$^2$/g that are surface treated with one or more types of organic silicon compounds; and
(D2) reinforcing fine particles or a composite thereof having an average BET specific surface area within a range of 10 to 100 m$^2$/g that are surface treated with one or more types of the organic silicon compounds.

Herein, the mass ratio of component (D1) and component (D2) is within a range of 50:50 to 99:1, may be within the range of 70:30 to 97:3, and is preferably within the range of 70:30 to 95:5. If the mass ratio of the aforementioned (D1) and (D2) is outside of this range, the viscosity of the curable organopolysiloxane composition prior to curing may increase and the mechanical strength and dielectric breakdown strength after curing may decrease.

When reinforcing filling materials, in other words, the aforementioned components (D1) and (D2), are added to the composition, the dynamic strength and dielectric breakdown strength of the organopolysiloxane cured product obtained by curing the curable organopolysiloxane composition according to the present invention can be increased. The added amount of these filling materials is within a range of 10 to 40 mass %, may be within a range of 15 to 35 mass %, and is particularly preferably within a range of 15 to 30 mass %, relative to the sum of components in the composition, which form a non-volatile solid fraction via a curing reaction, as the sum of component (D1) and component (D2). If the upper limit of the aforementioned mass percentage range is exceeded, a uniform and thin film coating may be difficult, while if the mass percentage is less than the lower limit of the aforementioned mass percentage range, the physical properties of the curable organopolysiloxane composition after curing may be insufficient.

The reinforcing filling materials, in other words, components (D1) and (D2) described above, must be surface treated with one or more types of organic silicon compounds. The surface treatment using the organic silicon compound is a hydrophobizing treatment and when component (D1) and component (D2), which are fillers treated with the organic silicon compound, are used, these reinforcing filling materials can be uniformly dispersed in the organopolysiloxane composition at a high filling ratio. Furthermore, an increase in the viscosity of the composition is inhibited, thereby improving moldability.

Examples of organic silicon compounds include: low molecular weight organic silicon compounds such as silanes, silazanes, siloxanes, and the like; and organic silicon polymers or oligomers such as polysiloxanes, polycarbosiloxanes, and the like. A so-called silane coupling agent is an example of a preferred silane. Typical examples of silane coupling agents include alkyltrialkoxysilanes (such as methyltrimethoxysilane, vinyltrimethoxysilane, hexyltrimethoxysilane, octyltrimethoxysilane, and the like) and trialkoxysilanes containing an organic functional group (such as glycidoxypropyltrimethoxysilane, epoxycyclohexyl ethyltrimethoxysilane, methacryloxypropyltrimethoxysilane, aminopropyltrimethoxysilane, and the like). Preferred siloxanes and polysiloxanes include hexamethyldisiloxanes, 1,3-dihexyl-tetramethyldisiloxanes, trialkoxysilyl single-terminated polydimethylsiloxanes, trialkoxysilyl single-terminated dimethylvinyl single-terminated polydimethylsiloxanes, trialkoxysilyl single-terminated organic functional group single-terminated polydimethylsiloxanes, trialkoxysilyl doubly-terminated polydimethylsiloxanes, organic functional group doubly-terminated polydimethylsiloxanes, and the like. When a siloxane is used, the number n of siloxane bonds is preferably within a range of 2 to 150. Examples of preferred silazanes include hexamethyldisilazanes, 1,3-dihexyl-tetramethyldisilazanes, and the like. A polymer having a Si—C—C—Si bond in a polymer main chain is an example of a preferred polycarbosiloxane.

Components (D1) and (D2) in the present invention are surface treated using the organic silicon compound described above. Specifically, the organic silicon compounds used for surface treating components (D1) and (D2) in the present invention most preferably contain at least one or more types selected from hexamethyldisilazane and 1,3-bis(3,3,3 trifluoropropyl)-1,1,3,3-tetramethyldisilazane. Note that a surface treatment using a surface treating agent other than an organic silicon compound may be used in combination, within a scope that does not impair the technical effects of the present invention.

The amount of the surface treating agent with regard to the total amount of the filler in the surface treatment is preferably within a range of 0.1 mass % or more and 50 mass % or less, and more preferably within a range of 0.3 mass % or more and 40 mass % or less. Note that the treatment amount is preferably the feed ratio of fillers to the surface treating agent, with excess treating agents preferably removed following treatment. Furthermore, there is no problem in using additives and the like that promote or assist a reaction when treating if necessary.

In the surface treatment, whether or not the components of the surface treating agent are chemically or physically fixed to the surface of the filler is an important parameter. For example, the fixed amount of the surface treating agent can be analyzed by reacting a composition containing a filler with excess tetraethoxysilane under alkaline conditions, then detecting the reaction product via gas chromatography.

The component amount of the surface treating agent fixed to the filler surface described above is preferably 1.0 mass part or more, more preferably 3.0 mass parts or more, relative to 100 mass parts of the filler amount. Of these, when two types of organic silicon compounds used for the surface treatment of components (D1) and (D2) according to the present invention are hexamethyldisilazane and 1,3-bis (3,3,3-trifluoropropyl)-1,1,3,3-tetramethyldisilazane, the ratio of fixation on the filler surface can be changed as needed. For example, in the present invention, a fluoroalkyl group represented by $(C_pF_{2p+1})$—R— (R represents an alkylene group having 1 to 10 carbon atoms, wherein p represents an integer of 1 to 8) can be introduced as the high dielectric functional group to a portion or all of component (A) or component (B), as described above. In terms of the dielectric properties, economy, ease of manufacturing, and moldability of the obtained curable organopolysiloxane composition, a group in which p=1, in other words, a trifluoropropyl group, is preferable. In this case, the weight ratio of the treatment components derived from hexamethyldisilazane and 1,3-bis(3,3,3-trifluoropropyl)-1,1,3,3-tetramethyldisilazane fixed to the filler surface is between 0 and 10, preferably between 0 and 5. When outside of this range, the affinity between component (A) or component (B) and the filler surface may be inferior, so the processability and physical properties after curing may be reduced.

[Other Functional Filling Materials]

In the curable organopolysiloxane composition of the present invention, a filling material other than the aforementioned component (D1) and component (D2) may or may not be used, as desired. If a filler is used, either or both of the inorganic filler and organic filler can be used. The type of filler used is not particularly limited, with examples including high dielectric fillers, conductive fillers, insulating fillers, and the like. One or more types thereof can be used. In particular, the composition of the present invention may optionally contain one or more fillers selected from a group consisting of high dielectric fillers, conductive fillers, and insulating fillers, in order to adjust the viscosity and provide functionality, so long as the transparency, coatability, and handling workability are not impaired.

One or more fillers may be used. The shape thereof is not particularly restricted, with any arbitrary shape including a particle shape, plate shape, needle shape, fibrous shape, and the like capable of being used. If the shape of the filler is a particulate, the particle size of the filler is not particularly limited and, for example, when measuring using a laser beam diffraction method or a dynamic light scattering method, the volume average particle size can be, for example, within a range of 0.001 to 500 µm. Furthermore, depending on the intended purpose of the filler, the volume average particle size of the filler can be 300 µm or less, 200 µm or less, 100 µm or less, 10 µm or less, or 0.01 µm or more, 0.1 µm or more, or 1 µm or more. If the shape of the filler is an anisotropic shape such as a plate shape, needle shape, or fibrous shape, the aspect ratio of the filler can be 1.5 or higher, 5 or higher, or 10 or higher. When fine particles having a volume average particle size of 0.01 µm or less and a maximum particle size of 0.02 µm or less are used, a cured product having substantially high transparency, particularly an adhesive film or electroactive layer film, can be manufactured.

Examples of other functional filling materials include dielectric inorganic fine particles, conductive inorganic fine particles, insulating inorganic fine particles, and thermally conductive inorganic fine particles. One or more types selected from these microparticles can be used in the composition of the present invention. Note that the inorganic fine particles simultaneously have two or more functions including functioning as a reinforcing filling material, or the like.

Examples of preferred dielectric inorganic fine particles include one or more inorganic fine particles selected from a group consisting of composite metal oxides in which a portion of barium and titanium sites of titanium oxide, barium titanate, strontium titanate, lead zirconate titanate, and barium titanate is substituted with calcium, strontium, yttrium, neodymium, samarium, dysprosium, or other alkaline earth metal, zirconium, or rare earth metals. Titanium oxide, barium titanate, zirconate titanate barium calcium, and strontium titanate are more preferable, with titanium oxide and barium titanate even more preferable.

Specifically, at least a portion of the dielectric inorganic fine particles are particularly preferably dielectric inorganic fine particles with a specific dielectric constant at room temperature at 1 kHz of 10 or more. Note that the upper limit of the preferable size (average primary particle size) of the inorganic fine particles is 20,000 nm (20 µm), but more preferably 10,000 nm (10 µm), taking into consideration the processability into a thin film for a transducer described later. Using the dielectric inorganic fine particles may further improve the mechanical properties and/or the electrical properties, particularly the specific dielectric constant, of the organopolysiloxane cured product.

The conductive inorganic fine particles are not particularly limited so long as conductivity can be applied to the organopolysiloxane cured product. Specific examples thereof include: conductive carbon black, graphite, vapor phase growth carbon (VGCF), and other conductive carbons; and metal powders of platinum, gold, silver, copper, nickel, tin, zinc, iron, aluminum, and the like. Further examples include: antimony-doped tin oxide, phosphorous-doped tin oxide, needle shaped titanium oxide the surface of which is coated with tin oxide/antimony, tin oxide, indium oxide, antimony oxide, zinc antimonate, and pigments obtained by coating tin oxide, and the like on a whisker surface of carbon or graphite; pigments obtained by coating at least one conductive metal oxide selected from a group consisting of tin-doped indium oxide (ITO), fluorine-doped tin oxide (FTO), phosphorous-doped tin oxide, and nickel oxide; pigments having conductivity containing tin oxide and phosphorus on the surface of titanium dioxide particles; and the like. These may be treated with the various surface treating agents described later. These may be used independently or two or more may be used in combination.

Furthermore, the conductive inorganic fine particles may be obtained by coating a conductive material such as a metal or the like on the surface of fibers such as glass fibers, silica alumina fibers, alumina fibers, carbon fibers, and the like, needle shaped reinforcing materials such as aluminum borate whiskers, potassium titanate whiskers, and the like, or inorganic filling materials such as glass beads, talc, mica, graphite, wollastonite, dolomite, and the like.

Insulating inorganic fine particles that can used in the present invention are not limited so long as the insulating inorganic materials are generally known, in other words, particles of inorganic materials having a volume resistivity of $10^{10}$ to $10^{18}$ Ω-cm. The shape thereof can be any shape such as a particle shape, flake shape, or fiber shape (including whiskers). Specific examples thereof include ceramic spherical particles, plate shaped particles, and fibers. Preferably used examples thereof include metal silicates such as alumina, iron oxide, copper oxide, mica, talc, and the like, and particles such as quartz, amorphous silica, glass, and the like. Furthermore, these may be treated with various surface treating agents described later. These may be used independently or two or more may be used in combination. When the insulating inorganic fine particles are added to the composition, the dynamic strength and dielectric breakdown strength of the organopolysiloxane cured product can be increased, with an increase in the specific dielectric constant also potentially being observed.

The amount of the insulating inorganic particles added is preferably within a range of 0.1 to 20 mass %, more preferably 0.1 to 5 mass %, with regard to the curable organopolysiloxane composition, based on the application. If the added amount is outside the aforementioned preferred range, the effect of adding may not be obtained or the dynamic strength of the organopolysiloxane cured product may be reduced.

Examples of thermally conductive inorganic fine particles that can be used in the present invention include: metal oxide particles such as magnesium oxide, zinc oxide, nickel oxide, vanadium oxide, copper oxide, iron oxide, silver oxide, and the like; and inorganic compound particles such as aluminum nitride, boron nitride, silicon carbide, silicon nitride, boron carbide, titanium carbide, diamond, diamond-like carbon, and the like. Zinc oxide, boron nitride, silicon carbide, and silicon nitride are preferable. When one or more of the thermally conductive inorganic fine particles is added to the composition, the thermal conductivity of the organopolysiloxane cured product can be increased.

The average particle size of the inorganic particles can be measured by a normal measurement method that is used in the field. For example, if the average particle size is approximately 50 nm or larger and 500 nm or less, the particle size is measured by observation using a microscope such as a transmission type electron microscope (TEM), a field emission type transmission electron microscope (FE-TEM), a scanning type electron microscope (SEM), a field emission type scanning electron microscope (FE-SEM), or the like, allowing the average value to be obtained as a measure of the average primary particle size. Meanwhile, if the average particle size is approximately 500 nm or more, the value of the average primary particle size can be directly obtained using a laser diffraction/scattering type particle size distribution measuring device or the like.

Inorganic particles other than components (D1) and (D2) may be treated as hydrophobic by a surface treating agent. The surface treatment can be performed by treating (or coating) the filler with a surface treating agent. Examples of a hydrophobic surface treating agent include at least one surface treating agent selected from the group consisting of organic titanium compounds, organic silicon compounds, organic zirconium compounds, organic aluminum compounds, and organic phosphorus compounds. The surface treating agent may be used independently or two or more types may be used in combination. Among these surface treating agents, an organic silicon compound and particularly silazanes, silanes, siloxanes, and polysiloxanes are preferred, with those having a silazane, alkyltrialkoxysilane, or trialkoxysilylpolydimethylsiloxane at one end preferably used. Furthermore, the amount of treatment or the like at this time is equivalent to the treatment method, amount of treatment, and the like described in the surface treatment of component (D1) and (D2).

[Use of Solvent]

The curable organopolysiloxane composition according to the present invention can be subjected to a curing reaction as is; however, when the composition or a portion of components thereof (for example, organopolysiloxane) is a solid or a viscous liquid, an organic solvent can be used if necessary in order to improve the miscibility and handling properties. Specifically, when the curable organopolysiloxane composition of the present invention is applied in the form of a film, the viscosity may be adjusted using a solvent within a range in which the overall viscosity is 100 to 50,000 mPa-s, and when diluted with a solvent, use is possible within a range of 0 to 2000 mass parts with regard to the sum (100 mass parts) of components (A) to (C). In other words, in the composition of the present invention, the solvent (E) may be 0 mass parts and is preferably a solvent-free type. In particular, by selecting a polymer with a low degree of polymerization for the curable organopolysiloxane composition of the present invention, a solvent-free design is possible, with no residue of a fluorinated solvent, organic solvent, or the like remaining in the film obtained after curing, which has the advantage of eliminating problems in terms of environmental impact and the effects of the solvent on electronic devices. Moreover, a low-solvent type composition may be used and is preferably of an amount such that the amount of the solvent (E) used is 10 mass parts or less, preferably 5 mass parts or less, based on the sum (100 mass parts) of the abovementioned components (A) to (C).

The organopolysiloxane cured film of the present invention is particularly preferably a film obtained by curing a solvent-free or low-solvent type curable organopolysiloxane composition. In particular, this is because, when the curable organopolysiloxane composition for forming a film obtained by solvent dilution is molded into a thin film, defects on the surface and inside of the film derived from residual solvent, phase separation, or the like may occur due to the selection of the solvent used for dilution. Meanwhile, when a die coating step is employed in which a slot die is used to coat a curable organopolysiloxane composition on a continuously traveling substrate supported between a pair of support rolls by means of a tension support system according to the present invention, a thin and high quality organopolysiloxane cured film can be obtained using a solvent-free or a low-solvent type curable organopolysiloxane composition.

In particular, the organopolysiloxane cured film of the present invention is preferably substantially free of organic solvent and is a cured film obtained by curing the solvent-free type curable organopolysiloxane composition described above. By sufficiently removing the organic solvent remaining during curing using the low-solvent type curable organopolysiloxane composition, it is meant that the content of the organic solvent with respect to the entire cured film is less than 0.1 mass %. Preferably, the content of the organopolysiloxane cured film of the present invention relative to the entire cured film of the organic solvent is preferably less than 0.01 mass %, more preferably less than 0.001 mass %, and particularly preferably less than or equal to the detection limit.

The type of organic solvent arbitrarily used is not particularly limited, so long as the solvent is a compound capable of dissolving all or a portion of the components of the composition. A type having a boiling point of 80° C. or higher and less than 200° C. is preferably used.

Preferably used examples of these organic solvents include one or more types of organic solvents selected from
(E1) organic polar solvents,
(E2) low molecular weight siloxane solvents, and
(E3) halogen solvents,
or mixed solvents thereof with a boiling point of 80° C. or higher and less than 200° C. Note that the solvent may be a mixed solvent of different organic solvents of different or same type at an arbitrary ratio. For example, the solvent may be a mixed solvent of (E1) organic polar solvent and (E2) low molecular weight siloxane solvent, a mixed solvent of (E1) organic polar solvent and (E3) halogen solvent, a mixed solvent of (E2) low molecular weight siloxane solvent and (E3) halogen solvent, a mixed solvent of all three of (E1) to (E3), or the same type of mixed solvent, such as a mixed solvent of hexamethyldisiloxane and octamethyltrisiloxane, which is the same (E2) low molecular weight siloxane solvent. These organic solvents can be appropriately selected according to the curing reactive organopolysiloxane and the modification ratio thereof.

The (E1) organic polar solvent is preferably one or more types selected from among methyl ethyl ketone, methyl butyl ketone, methyl isobutyl ketone, dimethyl fumarate (DMF), N-hexaldehyde, acetone, benzaldehyde, methyl acetate, propyl acetate, acetophenone, pentyl acetate, butyraldehyde, ethyl methyl acetate, ethyl ether, and tetrahydrofuran (THF).

Similarly, the (E2) low molecular weight siloxane solvent is preferably one or more types selected from among hexamethyldisiloxane, tetramethyldivinyldisiloxane, tetramethyldivinyldisiloxane, 2-methylphenethylpentamethyldisiloxane, octamethyltrisiloxane, and 1,3-difluorotetramethyldisiloxane.

Similarly, the (E3) halogen solvent is preferably one or more types selected from among trifluoromethylbenzene, 1,2-bis(trifluoromethyl)benzene, 1,3-bis(trifluoromethyl)benzene, 1,4-bis(trifluoromethyl)benzene, trifluoromethylchlorobenzene, trifluoromethylfluorobenzene, and hydrofluoroether. In particular, higher fluoroalkyl group content in the curable organopolysiloxane composition can lead to a more uniform miscibility, with a lower viscosity capable of being achieved by increasing the content ratio of the halogen solvent described above.

Particularly preferably, the organic solvents described above contain at least one low molecular weight siloxane solvent selected from among hexamethyldisiloxane, octamethyltrisiloxane, and mixtures thereof, which are commercially available from Dow Silicones Corporation under the names OST-10, OST-20, and OST-2. Furthermore, when the fluoroalkyl group content in the curable organopolysiloxane composition is high, the optional use of these low molecular weight siloxane solvents together with the halogen solvents described above is also included in a preferable form of the present invention.

If a curable organopolysiloxane and the curing agent described later essentially do not contain halogen atoms derived from fluoroalkyl groups or the like, or specifically, if the sum of halogen atoms in the curable organopolysiloxane and the curing agent is less than 1 mass %, the organic solvent described above preferably includes one or more types of organic solvent selected from among (E1) organic polar solvents and (E2) low molecular weight siloxane solvents, or a mixed solvent thereof, and preferably does not substantially contain (E3) halogen solvents. In particular, if the curable organopolysiloxane and the curing agent contain an alkylsiloxane unit, such as a dimethyl siloxane unit or the like, and at least 50 mol %, preferably at least 75 mol % of the total amount of siloxane units, the organic solvent described above is particularly preferably at least one low molecular weight siloxane based solvent selected from among hexamethyldisiloxane and octamethyltrisiloxane or mixed solvents thereof. This is because one or more types of organic solvents selected from among (E1) organic polar solvents and (E2) low molecular weight siloxane solvents, or a mixed solvent thereof, has excellent affinity and compatibility with polyalkylsiloxanes that do not contain halogen atoms and provides a uniform composition.

On the other hand, when the curable organopolysiloxane and curing agent contain halogen atoms derived from fluoroalkyl groups or the like, particularly when the sum of halogen atoms in the curable organopolysiloxane and the curing agent is 1 mass % or more, preferably 3 mass % or more, and more preferably 5 mass % or more, one or more types of the organic solvent selected from among (E1) organic polar solvents and (E3) halogen solvents, or a mixed solvent thereof, is particularly preferably included as the organic solvent. This is because when the content of halogen atoms derived from fluoroalkyl groups and the like is high, (E1) organic polar solvents and (E3) halogen solvents or mixed solvents containing the solvents have excellent affinity and compatibility with the curable organopolysiloxane and curing agent and provides a uniform composition. Meanwhile, when only (D2) low molecular weight siloxane based solvent is used for the curable organopolysiloxane and the curing agent having a high halogen content derived from fluoroalkyl groups or the like, the composition of the present invention may not satisfy the property of sufficient coatability.

[Overall Viscosity]

The total viscosity of the curable organopolysiloxane composition used in the present invention measured at 25° C. and a shear rate of 10.0 ($S^{-1}$) is preferably within the range of 5 to 500,000 mPa·s, particularly preferably within the range of 1,000 to 100,000 mPa·s. In order to achieve the preferred viscosity range, although the amount of the organic solvent used can be adjusted, the composition is preferably a low-solvent type or solvent-free (solvent-free type).

When a manufacturing method for the organopolysiloxane cured film is employed that includes a die coating step in which a slot die is used to coat a curable organopolysiloxane composition on a continuously traveling substrate supported between a pair of support rolls by means of a tension support system described below, the overall viscosity of the curable organopolysiloxane composition is preferably within the range of 1,000 to 100,000 mPa·s, more preferably within the range of 3,000 to 75,000 mPa·s.

[Thixotropic Ratio]

The curable organopolysiloxane composition of the present invention preferably has excellent flowability and does not exhibit thixotropic behavior. This makes it possible to achieve properties with low overall viscosity and excellent uniformity of application. Specifically, the thixotropic ratio, which is the ratio of the viscosity of the entire composition measured at a shear rate of 0.1 ($S^{-1}$) to the viscosity of the entire composition measured at a shear rate of 10.0 ($S^{-1}$) ($S^{-1}$), of the composition is preferably 15.0 or less and particularly preferably 10.0 or less. Note that, if a solvent other than (E1) to (E3) described above is used, or if component (E2) is used for a curable organopolysiloxane composition having a high halogen content, the thixotropic ratio of the entire composition exceeds the aforementioned upper limit. Therefore, it may be difficult to coat so as to form a uniform thin layer film.

[Solid Fraction Amount]

In the curable organopolysiloxane composition according to the present invention, so long as the viscosity range and the type of organic solvent described above are selected, the solid fraction amount thereof is not particularly limited. However, in order to achieve an organopolysiloxane cured film having sufficient thickness for practical use, the content of the component that cures to form an organopolysiloxane cured product, which is a non-volatile solid fraction (in the present invention, simply referred to as the "solid fraction"), is preferably within a range of 5 to 100 mass %, more preferably within the range of 50 to 100 mass %, 75 to 100 mass %, or 85 to 100 mass % of the overall composition.

[Introduction of Dielectric Functional Group]

When the organopolysiloxane cured film of the present invention is used as an electroactive film (for example, a dielectric film) used in a transducer such as an actuator or the like, a high dielectric functional group may be introduced to the cured product. However, even an organopolysiloxane cured film that does not contain a high dielectric functional group can be used as an electroactive film. Note that WO2014/105959 and the like by the present applicants proposes, for example, introducing high dielectric functional groups and improving the specific dielectric constant.

Introduction of a high dielectric functional group can be performed using an organopolysiloxane or organohydrogenpolysiloxane having a high dielectric functional group as a portion or all of component (A) or component (B), or by adding an organic additive having a high dielectric functional group, a non-reactive organic silicon compound having a high dielectric functional group, or the like to the curable composition. In terms of improving the miscibility with the curable composition and the specific dielectric constant of the cured product, 10 mol % or more, preferably 20 mol % or more, and more preferably 40 mol % or more of all substitution groups on the silicon atoms in the organopolysiloxane or organohydrogenpolysiloxane, which is component (A) or component (B), are substituted by a high dielectric functional group.

The type of high dielectric functional group introduced to the organopolysiloxane cured film is not particularly limited, with examples including: a) halogen atoms and groups containing a halogen atom as represented by 3,3,3=trifluoropropyl groups and the like; b) groups containing a nitrogen atom as represented by cyanopropyl groups and the like; c) groups containing an oxygen atom as represented by carbonyl groups and the like; d) heterocyclic groups such as imidazole groups and the like; e) groups containing a boron atom such as borate ester groups and the like; f) groups containing phosphorus such as phosphine groups and the like; and g) groups containing a sulfur atom such as thiol groups and the like. Halogen atoms including a fluorine atom and groups containing only a halogen atom are preferably used.

In the present invention, a fluoroalkyl group represented by $(C_pF_{2p+1})$—R— (R represents an alkylene group having 1 to 10 carbon atoms, while p represents an integer of 1 to 8) is preferably introduced as the high dielectric functional group to a portion or all of component (A) or component (B). The fluoroalkyl group provides a product having an excellent specific dielectric constant, in addition to providing a cured product with excellent transparency because of the components having a fluoroalkyl atom, which improves the compatibility of the components. Specific examples of the fluoroalkyl group include trifluoropropyl groups, pentafluorobutyl groups, heptafluoropentyl groups, nonafluorohexyl groups, undecafluoroheptyl groups, tridecafluorooctyl groups, pentadecafluorononyl groups, and heptadecafluorodecyl groups. Of these, in terms of the dielectric properties, economy, ease of manufacturing, and moldability of the obtained curable organopolysiloxane composition, a group in which p=1, in other words, a trifluoropropyl group, is preferable.

In addition to the aforementioned components, other components may be added, if necessary, to the curable organopolysiloxane composition according to the present invention so long as the object of the present invention is not impaired. Examples of other components include hydrosilylation reaction inhibitors, mold release agents, insulating additives, adhesion improving agents, heat resistance improving agents, fillers, pigments, and various other conventionally known additives. For example, an inorganic filler can be added for the purpose of adjusting the overall viscosity or improving functionality, such as improving the dielectric properties and the like.

[Hydrosilylation Reaction Inhibitor]

A hydrosilylation reaction inhibitor is added to suppress a crosslinking reaction from occurring between components (A) and (B), extend work life at ambient temperature, and improve storage stability. Therefore, for practical purposes, a hydrosilylation reaction inhibitor that inhibits the curable composition of the present invention is a preferable component.

Examples of the hydrosilylation reaction inhibitor include acetylenic compounds, enyne compounds, organic nitrogen compounds, organic phosphorus compounds, and oxime compounds. Specific examples include: alkyne alcohols such as 3-methyl-1-butyne-3-ol, 3,5-dimethyl-1-hexyne-3-ol, 3-methyl-1-pentyne-3-ol, 1-ethynyl-1-cyclohexanol, phenyl butanol, and the like; enyne compounds such as 3-methyl-3-pentene-1-yne, 3,5-dimethyl-1-hexyne-3-yne, and the like; methylalkenylcyclosiloxanes such as 1,3,5,7-tetramethyl-1,3,5,7-tetravinylcyclotetrasiloxane, 1,3,5,7-tetramethyl-1,3,5,7-tetrahexenylcyclotetrasiloxane, and the like; as well as benzotriazoles.

The amount of hydrosilylation reaction inhibitor added is an effective amount for extending the working life at ambient temperature and improving the storage stability of the present invention. Normally, the range is 0.001 to 5 mass % and preferably 0.01 to 2 mass % per 100 mass % of component (A); however, appropriate selection is possible based on the type of the present component, the performance and amount of the platinum based catalyst, the amount of alkenyl groups in component (A), the number of silicon atom-bonded hydrogen atoms in component (B), and the like.

[Other Optional Components]

The curable organopolysiloxane composition according to the present invention can contain an additive, adhesion improving agent, or the like in order to further improve the mold releasability or dielectric breakdown properties.

A film-like or sheet-like cured product obtained by curing the curable organopolysiloxane composition according to the present invention into a thin film can be preferably utilized for an adhesive film and an electroactive film (dielectric layer or electrode layer) forming a transducer. However, if the mold releasability of the cured layer is inferior when forming a thin film, if an organopolysiloxane cured film is manufactured at a particularly high speed, the film may be damaged due to mold releasing. Furthermore, in a dielectric layer used in an actuator, touch panel, or the like, the adhesion may need to be reduced in order to improve the sensitivity at low pressure. The curable organopolysiloxane composition of the present invention can improve the manufacturing speed of the film without damaging the film and the pressure-sensitive adhesion may be further reduced by adding another mold release agent.

Examples of mold releasability improving additives (mold release agents) that can be applied to the curable organopolysiloxane composition of the present invention include carboxylic acid based mold release agents, ester based mold release agents, ether based mold release agents, ketone based mold release agents, alcohol based mold release agents, and the like. One type thereof may be used independently, or two or more types thereof may be used in combination. Furthermore, examples of the mold release agents that can be used include mold release agents not containing silicon atoms, mold release agents containing silicon atoms, and mixtures thereof. Specific example include those proposed in the aforementioned WO2014/105959.

The dielectric breakdown properties improving agent is preferably an electrical insulation improving agent and can be selected from a group consisting of hydroxides and salts of aluminum or magnesium, clay minerals, and mixtures thereof, specifically, aluminum silicate, aluminum sulfate, aluminum hydroxide, magnesium hydroxide, fired clay, montmorillonite, hydrotalcite, talc, and mixtures thereof. Furthermore, the insulation improving agent may be treated by a known surface treatment method. Specific examples include those proposed in the aforementioned WO2014/105959.

The adhesion improving agent is for improving adhesion to a substrate with which the curable organopolysiloxane composition of the present invention is in contact during curing. If the dielectric layer serving as the cured product of the composition will not be re-peeled, it is an effective additive. Examples of adhesion improving agents include vinyltriethoxysilane, allyltrimethoxysilane, allyltriethoxysilane, 3-glycidoxypropyltrimethoxysilane, 3-methacryloxypropyltrimethoxysilane, and other organic functional alkoxysilane compounds, along with siloxane derivatives thereof, particularly chain or three dimensional resinous siloxane derivatives substituted with an organic group containing fluorine. Particularly preferred examples of the adhesion improving agent include one or two or more types selected from:

(g1) reaction mixtures between an organoalkoxysilane containing an amino group and organoalkoxysilane containing an epoxy group;

(g2) an organic compound having at least two alkoxysilyl groups in one molecule, in addition to containing a bond other than a silicon-oxygen bond between the silyl groups; and (g3) silanes containing an epoxy group as represented by the general formula:

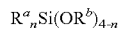

$R^a{}_nSi(OR^b)_{4-n}$ (wherein, $R^a$ represents an organic group containing a monovalent epoxy group, $R^b$ represents an alkyl group having from 1 to 6 carbon atoms, or a hydrogen atom. n represents a number within a range of 1 to 3), or a partially hydrolyzed condensate thereof; and (g4) an alkoxysilane (excluding those having an organic group containing an epoxy group), or a partially hydrolyzed condensate thereof;

and the like.

So long as a technical effect of the present invention is not impaired, examples of other optional components include: phenol based antioxidants, quinone based antioxidants, amine based antioxidants, phosphorus based antioxidants, phosphite based antioxidants, sulfur based antioxidants, thioether based antioxidants, and other antioxidants; triazole based light stabilizers, benzophenone based light stabilizers, and other light stabilizers; phosphoric ester based flame retardants, halogen based flame retardants, phosphorus based flame retardants, antimony based flame retardants, and other flame retardants; one or more antistatic agents including cation based surfactants, anion based surfactants, nonionic surfactants, and the like; dyes; pigments; and the like.

The curable organopolysiloxane composition of the present invention can be prepared by uniformly mixing a curable organopolysiloxane and a component promoting a curing reaction, preferably components (A) to (C), and by adding and uniformly mixing another optional component if necessary. Mixing at ambient temperature may be performed using various stirrers or kneaders. Mixing under heat may be performed when combining components that are not cured during mixing.

So long as curing does not occur during mixing, the adding order of the components is not particularly limited. When not used immediately after mixing, a crosslinking agent (for example, component (B)) and a curing reaction promoting component (for example, component (C)) may be stored separately in a plurality of containers so as to not be present in the same container, with the components in all containers capable of being mixed immediately prior to use.

The curing reaction of the curable organopolysiloxane composition of the present invention proceeds at room temperature for a curing reaction based on condensation reactions such as dehydration, de-alcoholization, and the like. However, if an organopolysiloxane cured film is produced by an industrial production process, the curing reaction is normally achieved by heating the composition or exposing the composition to active energy rays. The curing reaction temperature by heating is not particularly limited, but is preferably 50° C. or higher and 200° C. or lower, more preferably 60° C. or higher and 200° C. or lower, and even more preferably 80° C. or higher and 180° C. or lower. Furthermore, the time for the curing reaction is dependent on the structure of the aforementioned components (A), (B), and (C) and is normally 1 second or more and 3 hours or less. Generally, the cured product can be obtained by being maintained within a range of 90 to 180° C. for 10 seconds to 30 minutes. Note that the film manufacturing method will be described later.

Examples of active energy rays that may be used in the curing reaction include ultraviolet rays, electron beams, radiation, and the like. Ultraviolet rays are preferable in terms of practicality. If the curing reaction is performed using ultraviolet rays, a catalyst for the hydrosilylation reaction having high activity to ultraviolet rays is used, for example, a bis(2,4-pentanedionato)platinum complex or a (methylcyclopentadienyl)trimethylplatinum complex is preferably added. The ultraviolet ray generating source is preferably a high pressure mercury lamp, a medium pressure mercury lamp, an Xe—Hg lamp, a deep UV lamp, or the like. The irradiation amount in this case is preferably 100 to 8,000 mJ/cm².

[Method of Manufacturing an Organopolysiloxane Cured Film]

The organopolysiloxane cured film of the present invention is a highly smooth, thin film, with excellent flatness and is preferably a high precision functional film that does not contain fine defects on the surface or inside, in addition to being a flat thin film that essentially does not have macroscopic unevenness. The organopolysiloxane cured film is preferably manufactured in a clean room to avoid the adhesion of airborne dust and the like to the surface and inside.

The organopolysiloxane cured film of the present invention can be preferably manufactured via a manufacturing method including a die coating step in which a slot die is used to coat the curable organopolysiloxane composition described above on a continuously traveling substrate supported between a pair of support rolls by means of a tension support system. As an example, the organopolysiloxane cured film of the present invention can be manufactured using a coater (model number M200DL, manufactured by Hirano Tecseed Co., Ltd.) equipped with a head (R2, R=5 mm, slit gap 250 µm, manufactured by Hirano Tecseed Co., Ltd.).

At this time, the maximum tension between the support rolls (the force per unit width) may be 1000 kg/250 mm, preferably within the range of from 1 to 500 kg/250 mm, more preferably within the range of from 5 to 250 kg/250 mm, and particularly preferably within the range of from 5 to 150 kg/250 mm.

According to the manufacturing method for an organopolysiloxane cured film according to the present invention, a substrate serving as a support body is bridged between a pair of rolls arranged in parallel by a tension support system, then continuously traveled, after which a coating solution is sprayed and coated onto the substrate from a slot die arranged between the pair of rolls and opposite the substrate serving as the support body. With this technique, the coating solution is extruded from a die tip in a state in which the support body is bent by pressing the die tip that sprays the coating solution of the slot die onto a support body bridged by applying a predetermined tension between the pair of rolls. By balancing the extrusion pressure of the coating solution extruded from the die tip and the repulsive force generated in the support body by pressing and bending the die tip, a coating solution layer having the predetermined thickness is formed between the die tip and the support body. Thereby, stable coating can be achieved even in thin film form.

At this time, the line speed (traveling speed) of the substrate serving as the support body is not particularly limited, but can be set to no greater than 1 m/min, alternatively no greater than 0.1 m/min, and can be appropriately selected according to the smoothness of the film, the viscosity of the curable organopolysiloxane composition, and the like. Moreover, if the coating width is the extent of approximately 200 mm when coating the coating solution from the die tip, it is particularly preferable to perform liquid supply of the curable organopolysiloxane composition by setting the line speed such that the value obtained by multiplying the coating width by the line speed and 8 µm (up to 16 µm) is a predetermined thickness.

In particular, the manufacturing method for the organopolysiloxane cured film according to the present invention preferably makes it possible to prepare a thin film of 20 µm or less with significantly high accuracy, such that the arithmetic average height (Sa) of the film surface is less than 0.50 µm, using a solvent-free or low-solvent type curable organopolysiloxane composition without substantially diluting with a solvent. The manufacturing method of the present invention is a method in which the coating is carried out by pressing a slot die against the web-like substrate, then balancing the solution pressure and web tension; however, the control accuracy of the tension and the accuracy of web traveling can control the film thickness accuracy. Here, the traveling accuracy of the web-like substrate is generally determined by the motor rotational accuracy and, if a vector inverter motor is used, it is easily possible to suppress vibrations caused by the traveling accuracy to 1% or less. Furthermore, by performing high-precision tension feedback control on the web-like substrate, it is possible to suppress variations in tension to 2% or less in general, and from this, high-precision coating accuracy can be achieved regardless of film thickness. Note that the range of the overall viscosity of the curable organopolysiloxane composition is as described above.

Note that the slot coating technique using a single roll as illustrated in FIG. 2, which is a comparative view, is often used for precision film manufacturing; however, due to the limits of the machining accuracy of the machine tool, the backup roll is eccentric by approximately 2 µm. Furthermore, even if precision grade bearings are used, runout of approximately 2 µm cannot be avoided, thereby making it difficult to manufacture the coating film of 20 µm while maintaining a film thickness deviation of 5%, which is not preferable as the manufacturing method of the present invention.

Preferred embodiments of the present invention will be described below with reference to the drawings. However, the following drawings are drawn so as to be exaggerated such that the configuration and arrangement of the members are easy to understand, with the relative size and distance of each member not matching the actual device.

FIG. 1 is a cross sectional view illustrating a schematic configuration of an embodiment of a device for performing the manufacturing method of the present invention. The curable organopolysiloxane composition according to the present invention as the coating solution 2 is coated to the surface of the support body 1, after which a coating film 3 is formed by the coating solution. The support body 1 is an elongated web-like substrate (such as a film, sheet, or the like) having flexibility, stretching in a state in which a predetermined tension is applied between the upstream side support roll 41 and the downstream side support roll 42 disposed in parallel and spaced apart from each other, then traveling in the direction of the arrow 30. FIG. 1 is a cross sectional view along a plane parallel with the traveling direction 30 of the support body 1.

A slot die 10 is disposed between the support rolls 41, 42 and opposite the support body 1. The slot die 10 is disposed on the opposite side of the support body 1 from the side on which the support rolls 41, 42 is disposed.

The structure of the slot die 10 is not particularly limited, but has an upstream side lip disposed upstream of the travel direction 30 of the support body 1 and a downstream side lip disposed on the downstream side, wherein a slot and a manifold in communication with each other are formed between the upstream side lip and the downstream side lip facing each other. An inlet inside the slot die is formed in communication with the manifold.

The curable organopolysiloxane composition according to the present invention, which is the coating solution 2, passes through the inlet before being pumped into the manifold inside the slot die. The coating solution 2 temporarily accumulates in the manifold and is substantially uniformly distributed in the width direction of the support body 1 (the direction orthogonal to the longitudinal direction of the support body 1, in other words, the direction perpendicular to the plane of the paper in FIG. 1), then the coating solution 2 passes through a slot between the lips of the slot die and is extruded toward the support body 1.

Here, when the curable organopolysiloxane composition is a multi-component composition (for example, in which two solutions are stored separately, one of which is a main agent solution having a curable reactive organopolysiloxane, while the other is a catalyst solution having a catalyst or the like which is a curing agent), as a method for reducing the curing time thereof, it is conceivable to reduce the retarder (hydrosilylation reaction inhibitor in the curing system by hydrosilylation reaction) in the curable organopolysiloxane composition; however, it may be accompanied by an adverse effect by which curing progresses inside a store tank for feeding and the slot die.

Consequently, as illustrated in FIG. 3, as a pre-step for feeding the main agent solution 5 and the catalyst solution 6 into the slot die 10, a method was devised of merging the solutions immediately before the slot die 10 via a stirring device 7 using mechanical force. The main agent solution 5 through the solution feeding line 5L and the catalyst solution 6 through the solution feeding line 6L are supplied to the stirring device 7 at a constant speed, then uniformly mixed at a constant ratio. According to this technique, it is possible to accelerate the curing speed by approximately 2 to 3-fold without changing the amount of the retarding agent in the curable organopolysiloxane composition. Consequently, the technique can contribute to improved production speed and quality of the organopolysiloxane cured film according to the present invention. The type of stirring device 7 is not particularly limited; however, the use of a static mixer is particularly preferable.

A uniform and flat thin film type organopolysiloxane cured film is formed on the support body 1 by curing the coating film 3 of the curable organopolysiloxane composition formed by the method described above on the support body 1 in FIG. 1 via a method corresponding to the aforementioned curing mechanism.

The substrate, which is the support body 1, is a film-like substrate, a tape-like substrate, or a sheet-like substrate (hereinafter, referred to as a "film-like substrate") and particularly preferably a flat substrate having a release surface, with the curable organopolysiloxane composition preferably being coated on the release surface. The substrate functions as a separator. Thereby, the organopolysiloxane cured film of the present invention laminated on the substrate can be smoothly separated from the release layer with slight force and adhered to an electronic device or the like, advantageously imparting excellent handling workability.

Exemplary types of substrates include paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils. Synthetic resin films and sheets are particularly preferable, with examples of synthetic resins including polyimide, polyethylene, polypropylene, polystyrene, polyvinyl chloride, polyvinylidene chloride, polycarbonate, polyethylene terephthalate, and nylon. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. At the same time, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

The substrate is preferably a film-like or sheet-like substrate. The thickness thereof is not particularly limited, but is normally approximately 5 to 300 μm. Furthermore, in order to improve the adhesion between a supporting film and pressure sensitive adhesive layer, a supporting film subjected to a primer treatment, corona treatment, etching treatment, or plasma treatment may be used. Furthermore, the opposite surface of the film-like substrate from the pressure sensitive adhesive layer surface may be subjected to surface treatments such as a treatment for scratch prevention, grime prevention, fingerprint adhesion prevention, anti-glare, anti-reflection, anti-static, or other treatment.

If the organopolysiloxane cured film of the present invention is an adhesive layer (including pressure-sensitive adhesive layer) or an electroactive film (including dielectric films such as a dielectric layer and the like), the cured layer is preferably handled as a laminated body film laminated in a releasable condition onto a film substrate provided with a release layer having release coating performance.

The amount of the curable organopolysiloxane composition coated onto the substrate must be such that the average thickness of the film after curing is 1 to 20 μm. Note that, optionally, the cured or semi-cured organopolysiloxane cured film may be further rolled. For example, an organopolysiloxane cured film having excellent flatness and significantly small defects on the film surface and inside the film can be obtained by adjusting the gap between the rolls to a constant level in which the average thickness is within a range of 1 to 20 μm, then rolling it.

Moreover, the rolling process may be performed in an uncured condition by coating the curable organopolysiloxane composition onto the substrate, which is preferable. Specifically, the curable organopolysiloxane composition, which is a raw material, can preferably be coated onto a sheet-like substrate provided with a release layer and rolled by roller rolling or the like, after which the smoothed and flattened curable organopolysiloxane composition can be cured by heating or the like to obtain the organopolysiloxane cured film of the present invention.

At this time, the condition of curing the smooth/flat coating layer of the curable organopolysiloxane composition is not particularly limited; however, it is preferable to use a hot air drier or the like to heat and dry within a range of 90 to 200° C., preferably within a range of 100 to 150° C.

The method of coating the curable organopolysiloxane composition before rolling onto the substrate and the like are the same as described above, with an organopolysiloxane cured product containing a fluoroalkyl group having the aforementioned primer layer and flattening layer capable of being subjected to a rolling process such as roller rolling or the like.

[Manufacturing Method Using Curing Between Separators Having Release Layer]

The organopolysiloxane cured film of the present invention can preferably be obtained by coating a substrate having a release layer on a coating surface of the curable organopolysiloxane composition, sandwiching the uncured coating surface between substrates (separators), and forming a physically uniformed flattening layer. Note that when forming the flattening layer, a laminated body obtained by coating the uncured curable organopolysiloxane composition between separators having a release layer may be rolled using a known rolling method such as roller rolling or the like.

[Use of Organopolysiloxane Cured Film]

The organopolysiloxane cured film of the present invention is a highly smooth, thin film, with excellent flatness and preferably has significantly few fine defects (voids originating from air bubbles, contaminated sites due to dust, or airborne dust) on the film surface and inside the film. Therefore, dielectric breakdown at these defects will not easily occur when the film is electrified by applying a high voltage, the film as a whole can achieve high dielectric breakdown strength, and can also achieve adhesion/pressure-sensitive adhesion as desired, in addition to being transparent and flat. Therefore, the organopolysiloxane cured film of the present invention is useful as an electronic material, a member for a display device, or a member for a transducer (including sensors, speakers, actuators, and generators) and can be particularly preferably used as an adhesive/pressure-sensitive adhesive film, an electroactive film (including high dielectric films), an electronic component, or a member for a display device. In particular, a transparent adhesive film or electroactive film is preferable as a member for a display panel or display and is particularly useful in so-called touch panel applications in which an apparatus, particularly an electronic apparatus, can be operated by touching a screen with a fingertip or the like. Similarly, an electroactive film with high dielectric breakdown strength is preferred in members for a transducer such as an actuator or the like in the form of a single layer or a laminated film and is particularly useful in applications for an actuator activated under high voltage.

INDUSTRIAL APPLICABILITY

The application of the organopolysiloxane cured film of the present invention is not limited to those disclosed above, with the use thereof possible in various flat panel displays (FPD) for displaying characters, symbols, or images, such as television receivers, monitors for a computer, monitors for a mobile information terminal, monitors for monitoring, video cameras, digital cameras, mobile phones, mobile information terminals, displays for an instrument panel of an automobile and the like, displays for an instrument panel of various equipment, and devices, automatic ticket machines, automatic teller machines, and the like. Application thereof is possible as a device for CRT displays, liquid crystal displays, plasma displays, organic EL displays, inorganic EL displays, LED displays, surface electrolytic displays (SEDs), field emitting displays (FEDs), and other display devices, or touch panels using the display devices. Similarly, the organopolysiloxane cured film of the present invention is a film-like or sheet-like member with excellent mechanical properties and electrical properties including dielectric breakdown strength, in addition to having a high specific dielectric constant and mechanical strength (specifically tensile strength, tear strength, elongation rate, and the like) if necessary. Therefore, the organopolysiloxane cured film can be used as an electronic material, a member for a display device, or a member for a transducer (including sensors, speakers, actuators, and generators) and can be particularly preferably used as an electroactive film (dielectric layer or electrode layer) forming a transducer. Specific methods of use involving a well-known method using a dielectric layer or pressure-sensitive adhesive layer can be used without limitation.

EXAMPLES

The present invention will be described below by way of examples; however, the present invention is not limited thereto. The following compounds were used in the Examples and Comparative Example described below.

Component (a1): Dimethylsiloxane polymer (amount of vinyl groups (mass %): 0.24 mass %, siloxane polymerization degree: 300) blocked at both ends with a vinyldimethylsiloxy group Component (a2): 3,3,3-trifluoropropylmethyl, dimethylsiloxane copolymer (amount of vinyl groups: 0.26 mass %, siloxane polymerization degree: 193) blocked at both ends with a vinyldimethylsiloxy group Component (b1): Dimethylsiloxy-methylhydrosiloxy-siloxane copolymer blocked at both ends with a trimethylsiloxy group (amount of silicon-bonded water: 0.71 mass %)

Component (b2): Dimethylsiloxane polymer blocked at both ends with a dimethyhydrosiloxy group (amount of silicon-bonded water: 0.02 mass %)

Component (b3): Dimethylsiloxane/3,3,3-trifluoropropylmethylsiloxane/methylhydrogen siloxane copolymer (amount of silicon-bonded hydrogens (wt %) is approximately 0.23) blocked at both ends with a trimethylsiloxy group Component (b4): Dimethylsiloxane/3,3,3-trifluoropropylmethylsiloxane copolymer (amount of silicon-bonded hydrogens (wt %) is approximately 0.014) blocked at both ends with a dimethyhydrosiloxy group Component (c1): Dimethyl siloxane polymer solution blocked at both ends by a vinyldimethylsiloxy group (approximately 0.6 wt % in platinum concentration) of a platinum-1,3-divinyl 1,1,3,3-tetramethyldisiloxane complex Component (d1): Fumed silica treated with hexamethyldisilazane (product name prior to treatment: AEROSIL® 200)

Component (d2): Fumed silica treated with hexamethyldisilazane (product name prior to treatment: AEROSIL® 50)

Component (d3): Fumed silica treated with hexamethyldisilazane and 1,3-bis(3,3,3-trifluoropropyl)-1,1,3,3-tetramethyldisilazane (product name prior to treatment: AEROSIL® 200)

Component (d4): Fumed silica treated with hexamethyldisilazane and 1,3-bis(3,3,3-trifluoropropyl)-1,1,3,3-tetramethyldisilazane (product name prior to treatment: AEROSIL® 50)

Component (e1): 1-ethynyl-1-cyclohexanol

Component (e2): 1,3,5,7-tetramethyl-1,3,5,7-tetravinylcyclotetrasiloxane

[Viscosity Prior to Curing]

The viscosity prior to the curing of each composition was measured using a viscoelasticity measuring device (manufactured by Anton Paar, model number MCR102). Measurements were performed using a 20 mm diameter, 2° cone—plate with different shear rates. The overall viscosities of the compositions measured at 25° C. and shear rates of 0.1 ($S^{-1}$) and 10.0 ($S^{-1}$) were recorded, respectively, then the viscosity of 10.0 ($S^{-1}$) was used.

[Evaluation of Surface Roughness]

An OLS4100 (manufactured by Olympus Co., Ltd.) equipped with a laser source having a wavelength of 405 nm was used to measure the arithmetic average height (Sa, μm) of the film surface after coating and curing. An objective lens (MPLAPONLEXT 50×) was used to measure arbitrary surface regions of approximately 1 mm×1 mm on each film as a measurement region in two regions. The results of the Examples and Comparative Examples are illustrated in Table 1.

Example 1

A liquid thermosetting organopolysiloxane composition (SYLGARD™ 184 HS A/B mixture, manufactured by Dow Chemical Co., Ltd.) was used. The viscosity prior to curing was 3.5 Pa·s regardless of the shear rate.

A mixture of SYLGARD™ 184 HS A/B mixture was coated in a width of 200 mm onto a substrate (FL1-01, thickness of 38 μm, width of 250 mm, manufactured by Takaline Corp.) using a coater (M200DL, manufactured by Hirano Tecseed Co., Ltd.) with a head (R2, R=5 mm, slit gap 250 μm, manufactured by Hirano Tecseed Co., Ltd.). At this time, the mixture was cured with a tension of 0.04 kg/mm at the dryer outlet, a line speed of 1 m/min, and hot air drying at 120° C. In-line, an organopolysiloxane cured film having the minimum thickness of 8 microns was produced by laminating a substrate (SP-PET, thickness of 25 μm, width of 300 mm, manufactured by Mitsui Chemicals Tohcello Co., Ltd.) to the top surface after curing. It was confirmed that the surface of the obtained organopolysiloxane cured film was in a mirror state and the homogeneity was good.

Comparative Example 1

An organopolysiloxane cured film was produced in the same manner as in Example 1, except the head was changed to a Comma (trade name, manufactured by Horano Tecseed Co., Ltd.) and the gap with the substrate was set to a minimum of 5 μm. The surface of the obtained organopolysiloxane cured film was not a mirror surface and the muscle was confirmed, so it was not possible to coat the surface to a thickness of 10 μm.

Example 2

A liquid curable organopolysiloxane composition 1 was prepared by blending the aforementioned component (a1) at 70.58 wt %, component (d1) at 22.10 wt %, component (d2) at 4.35 wt %, component (b1) at 0.99 wt %, component (b2) at 3.83 wt %, component (c1) at 0.10 wt %, and component (e1) at 0.04 wt %. At this time, the silicon atom-bonded hydrogen atoms (Si—H) of component (b) were used at an amount of approximately 1.2 mols per 1 mol of vinyl groups in the composition. The viscosity prior to curing was 218 Pa·s at 0.1 ($S^{-1}$) and 26 Pa·s at 10.0 ($S^{-1}$).

The composition of Example 2 was coated in a width of 115 mm onto a substrate peeling PET (F-1042-50U, thickness of 50 μm, width of 125 mm, manufactured by RUNDE Co., Ltd.) using a coater (M200DL, manufactured by Hirano Tecseed Co., Ltd.) with a head (R2, manufactured by Hirano Tecseed Co., Ltd.). At this time, the composition was cured with a tension of 0.12 kg/mm at the dryer outlet, a line speed of 1 m/min, and hot air drying at 125° C. In-line, an organopolysiloxane cured film having a thickness of 10 microns was produced by laminating a peeling PET (F-1042-50U, thickness of 50 μm, width of 125 mm, manufactured by RUNDE Co., Ltd.) to the top surface after curing. It was confirmed that the surface of the obtained organopolysiloxane cured film was in a mirror state and the homogeneity was good.

Example 3

A liquid curable organopolysiloxane composition is prepared by blending the aforementioned component (a2) at 68.36 wt %, component (b3) at 5.06 wt %, component (b4) at 5.06 wt %, component (c1) at 0.10 wt %, component (d2) at 18.88 wt %, component (d3) at 2.34 wt %, and component (f) at 0.28 wt %. At this time, the silicon atom-bonded hydrogen atoms (Si—H) of component (b) were used at an amount of approximately 1.2 mols per 1 mol of vinyl groups in the composition. The viscosity prior to curing was 148 Pa·s at 0.1 ($S^{-1}$) and 16 Pa·s (16000 mPa·s) at 10.0 $S^{-1}$).

A uniform organopolysiloxane cured film having a thickness of 10 μm was able to be produced by carrying out the same procedure as in Example 2, except that the composition of Example 3 was used.

TABLE 1

|  | Example 1 | Example 2 | Example 3 | Comparative Example 1 |
|---|---|---|---|---|
| Region 1 | 0.261 | 0.147 | 0.141 | 0.949 |
| Region 2 | 0.196 | 0.222 | 0.142 | 1.552 |
| Arithmetic average height (Sa) μm | 0.229 | 0.185 | 0.142 | 1.251 |
| Surface state | Mirror-like uniform | Mirror-like uniform | Mirror-like uniform | With a streak |

In Examples 1 to 3, using a web tension die technique, a uniform organopolysiloxane cured film having a film thickness of 20 μm or less and an arithmetic average height (Sa) of 0.5 μm or less on the surface was obtained. These are provided with a mirror surface and have significantly excellent smoothness and flatness, with no surface defects observed, and therefore, high breakdown strength against a load voltage can be anticipated.

DESCRIPTION OF THE REFERENCE NUMERALS

1 Support body
2 Coating solution
3 Coating film
30 Traveling direction of support body
4 Support roll (single)
41 Upstream side support roll
42 Downstream side support roll
5 Main agent solution
5L Feeding line of main agent solution
6 Catalyst solution
6L Feeding line of catalyst solution
7 Stirring device
10 Slot die

The invention claimed is:

1. An organopolysiloxane cured film in which an arithmetic average height (Sa) of the film surface is less than 0.50 μm, while an average thickness at the center of the film is within a range of 1 to 20 μm;
   wherein the organopolysiloxane cured film is obtained by curing a curable organopolysiloxane composition comprising:
   (A) an organopolysiloxane with at least two curing reactive groups having a carbon-carbon double bond in a molecule;
   (B) an organohydrogenpolysiloxane having at least two silicon-bonded hydrogen atoms in a molecule in an amount in which the silicon-bonded hydrogen atoms are within a range of 0.1 to 2.5 mols per 1 mol of carbon-carbon double bonds in component (A);
   (C) an effective amount of a hydrosilylation reaction catalyst;
   (D1) reinforcing fine particles or a composite thereof having an average BET specific surface area of greater than 100 $m^2/g$ that are surface treated with one or more types of organic silicon compounds; and (D2) reinforcing fine particles or a composite thereof having an average BET specific surface area within a range of 10 to 100 m²/g that are surface treated with one or more types of the organic silicon compounds, where the one or more types of the organic silicon compounds are the same as or different from the one or more types of organic silicon compounds used to treat component (D1);

wherein a portion or all of component (A) or component (B) is an organopolysiloxane or an organohydrogenpolysiloxane, respectively, having a high dielectric functional group selected from: a) halogen atoms and groups containing a halogen atom; b) groups containing a nitrogen atom; c) groups containing an oxygen atom; d) heterocyclic groups; e) groups containing a boron atom; f) groups containing phosphorus; and g) groups containing a sulfur atom;

wherein the mass ratio of component (D1) and component (D2) is within a range of 50:50 to 99:1;

wherein the total viscosity of the curable organopolysiloxane composition measured at 25° C. and a shear rate of 10.0 ($S^{-1}$) is within the range of 1,000 to 100,000 mPa·s; and wherein the organopolysiloxane cured film has the following mechanical properties measured when heated and molded into a sheet having a thickness of 2.0 mm, based on JIS K 6249:

(1) the Young's modulus (MPa) at room temperature is within a range of 0.1 to 2.5 MPa;
(2) the tear strength (N/mm) at room temperature is within a range of 2 N/mm or higher;
(3) the tensile strength (MPa) at room temperature is within a range of 2 MPa or higher; and
(4) the elongation at break (%) is within a range of 200 to 1000%.

2. The organopolysiloxane cured film according to claim 1, wherein the average thickness at the center of the film is within a range of 1 to 10 μm.

3. The organopolysiloxane cured film according to claim 1, wherein the film is substantially free of organic solvents.

4. The organopolysiloxane cured film according to claim 1, wherein the mass ratio of component (D1) and component (D2) is within a range of 70:30 to 97:3.

5. The organopolysiloxane cured film according to claim 1, wherein the curable organopolysiloxane composition is a solvent-free or low-solvent type composition.

6. An electronic material or a member for a display device, comprising the organopolysiloxane cured film according to claim 1.

7. A laminated body having a structure in which the organopolysiloxane cured film according to claim 1 is laminated onto a sheet-like substrate provided with a release layer.

8. An electronic component or display device, comprising the organopolysiloxane cured film according to claim 1.

9. A manufacturing method for the organopolysiloxane cured film according to claim 1, comprising a die coating step in which a slot die is used to coat a curable organopolysiloxane composition on a continuously traveling substrate supported between a pair of support rolls.

10. The manufacturing method for the organopolysiloxane cured film according to claim 9, wherein the substrate is a film-like substrate having a release layer.

11. The manufacturing method for the organopolysiloxane cured film according to claim 9, comprising coating the curable organopolysiloxane composition using the slot die onto the substrate, then curing the curable organopolysiloxane composition.

12. The manufacturing method for the organopolysiloxane cured film according to claim 9, wherein the curable organopolysiloxane composition is a multi-component composition, further comprising a mixing step for preparing the curable organopolysiloxane composition by mixing each component via a stirring device using mechanical force, as a pre-step to feeding the curable organopolysiloxane composition into the slot die.

13. The manufacturing method for the organopolysiloxane cured film according to claim 12, wherein the stirring device using mechanical force is a static mixer and the mixing step for preparing the curable organopolysiloxane composition and the step of feeding the curable organopolysiloxane composition into the slot die are continuous.

14. The manufacturing method for the organopolysiloxane cured film according to claim 9, wherein the curable organopolysiloxane composition is a solvent-free or low-solvent type composition that does not include a step involving dilution with a solvent.

15. The manufacturing method for the organopolysiloxane cured film according to claim 10, including a step involving curing the curable organopolysiloxane composition in a state sandwiched between separators having the release layer.

16. A manufacturing device for the organopolysiloxane cured film according to claim 1, the manufacturing device comprising:
at least one pair of support rolls;
a continuously traveling substrate supported between the pair of support rolls via a tension support system;
a slot die for coating a curable organopolysiloxane composition on the substrate; and
a stirring and mixing device using mechanical force for feeding the curable organopolysiloxane composition into the slot die.

17. The organopolysiloxane cured film according to claim 1, wherein component (A) is an organopolysiloxane mixture comprising:
(a1) a straight chain or branched chain organopolysiloxane having an alkenyl group only at an end of a molecular chain; and
(a2) an organopolysiloxane resin comprising an alkenyl group having at least one branched siloxane unit.

18. The organopolysiloxane cured film according to claim 1, wherein the arithmetic average height (Sa) of the film surface is within a range of 0.01 to 0.50 μm.

19. The organopolysiloxane cured film according to claim 1, wherein the organopolysiloxane cured film is manufactured by coating the curable organopolysiloxane composition on a continuously traveling substrate supported between a pair of support rolls via a tension support system with use of a slot die.

20. The organopolysiloxane cured film according to claim 19, wherein the force between the support rolls is within a range of from 5 to 150 kg/250 mm per unit width.

* * * * *